United States Patent [19]
Johnson

[11] Patent Number: 5,765,039
[45] Date of Patent: Jun. 9, 1998

[54] METHOD FOR PROVIDING OBJECT DATABASE INDEPENDENCE IN A PROGRAM WRITTEN USING THE C++ PROGRAMMING LANGUAGE

[75] Inventor: Peter Johnson, Foothill Ranch, Calif.

[73] Assignee: Unisys Corpration, Blue Bell, Pa.

[21] Appl. No.: 505,140

[22] Filed: Jul. 21, 1995

[51] Int. Cl.[6] ........................................................ G06F 9/44
[52] U.S. Cl. ........................................................ 395/682
[58] Field of Search ............................................. 395/682

[56] References Cited

U.S. PATENT DOCUMENTS

| 5,465,362 | 11/1995 | Ortone et al. | 395/682 |
| 5,499,343 | 3/1996 | Pettus | 395/682 |
| 5,613,122 | 3/1997 | Burnard et al. | 395/701 |

*Primary Examiner*—Emanuel T. Voeltz
*Assistant Examiner*—John Q. Chavis
*Attorney, Agent, or Firm*—J. Ronald Richebourg; Mark T. Starr; Steven R. Petersen

[57] ABSTRACT

The method of the present invention is useful in a computer system having a user interface, a CPU, a memory, at least one disk drive and an object database stored in one or more disk drives. The method is used to derive an object database independent standard API from the description of the object in the object database. The method of the present invention, which is executable by the computer system, comprises the following steps: for each database type, TYPE, declared in the database, executing the following steps: opening a file on said at least one disk drive and storing therein the results of the following steps; declaring a surrogate class sTYPE; for each property, PROP, of TYPE, declaring accessors and mutators; declaring construct and destruct member functions; for each operation, OP, of TYPE, declaring member functions; and, declaring special functions.

21 Claims, 16 Drawing Sheets

METHOD FOR PROVIDING OBJECT DATABASE INDEPENDENCE IN A PROGRAM WRITTEN USING THE C++ PROGRAMMING LANGUAGE

FIELD OF THE INVENTION

The present invention relates to the field of object databases and C++ programming in general and in particular to a method for providing independence among various different object oriented databases within a C++ program.

BACKGROUND OF THE INVENTION:

The C++ programming language allows programs to define transient objects. Transient objects remain in existence only as long as the program is running. Object databases provide C++ programs with the ability to define persistent objects. Persistent objects remain in existence even after the program stops running. The same program, or even another program, can access the persistent objects at a later time.

Each database has its own unique way to declare persistent objects and to access the data within those objects. This reality makes it difficult for a C++ programmer to change the object database that a C++ program uses. Therefore, the C++ programmer is forced to choose a particular object database and program compatible with that database. If the programmer later chooses to change an object database, they must convert all programs that used the original object database. Also, for more background information regarding C++ programming and detailed explanations of symbology used herein reference is made to a textbook entitled Borland C++ 3.0, published by Borland International, Inc., 1800 Green Hills Road, P.O. Box 660001, Scotts Valley, Calif., 95067-0001.

BRIEF SUMMARY OF THE INVENTION

It is therefore an object of the present invention to provide a well-defined database independence layer to minimize the changes required when moving a C++ program from one object database to another.

Another object of the present invention is to provide a method that minimizes changes required to application software in order to access databases in C or C++ programming language, or as between databases, both of which are in C++ language.

It is yet another object of the present invention to define an object database independent standard application programming interface (API). Any programs written to use this API will not have to be changed to move from one object database to another. At most, such programs will only have to be relinked or perhaps recompiled.

Still another object of the present invention is to provide a schema that maps the types and features of a database to C++ programming language classes and member functions.

An advantage of the method of the present invention is that the API does not require changes in the source code of the tool or the application software when moving between databases.

Another advantage of the method of the present invention is that when schema are added existing tools (e.g. application software) and servers do not need to be recompiled.

The method of the present invention is useful in a computer system having a user interface, a CPU, at least one disk drive, a memory, and an object database stored in one or more disk drives. The method is used to derive an object database independent standard API from the description of the object in the object database. The method of the present invention, which is executable by the computer system, comprises the following steps: for each database type, TYPE, declared in the database, executing the following steps: opening a file on said at least one disk drive and storing therein results of the following steps, declaring a surrogate class, sTYPE, for a database type, TYPE; for each property, PROP, of TYPE, declaring accessors and mutators; declaring construct and destruct member functions; for each operation, OP, of TYPE, declaring member functions; and, declaring special functions.

DETAILED DESCRIPTION

Before proceeding with a detailed description of the method of the present invention a background discussion of using object databases with a C++ program would be helpful. This discussion will focus on the problem area that the present invention solves; i.e., the disparity of application programming interfaces among object databases. Background information that may be helpful in understanding the present invention may be had by reference to a co-pending patent application Ser. No. 08/382,303 also assigned to the assignee of this application and entitled A METHOD FOR SUPPORTING OBJECT MODELING IN A REPOSITORY, now U.S. Pat. No. 5,644,764. Additional background information on object technology and terminology is also given to provide a common ground in which to discuss the invention.

Figure 1:
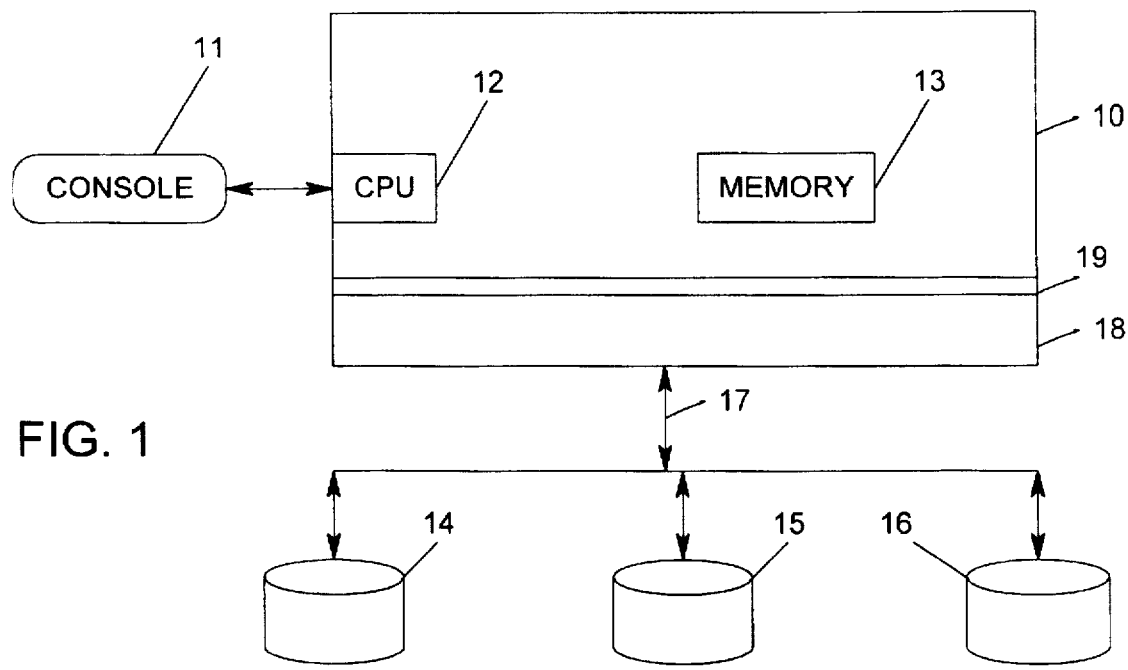
FIG. 1 is a generalized block diagram of a system that may use the method of the present invention.

Referring now to the drawings and FIG. 1 in particular, a block diagram is shown of a computer system 10 including an operator console 11 a CPU 12 and a memory 13. The system 10 has access to databases 14, 15 and 16 by means of a bus 17 coupled through an application programming interface ("API") 18. The API 18 is coupled to the system 10 by means of a database independence or C++ binding layer, which is schematically illustrated in FIG. 1 as layer 19 representing the method of the present invention. That is, the software running in the memory 13 accesses one or more of the databases 14–16 by means of the C++ binding layer 19.

Object Terminology

A normal object program stores objects in the computer system's memory 13. When the program terminates, the memory used by those objects is freed and reused by other programs, making the objects that the program stored transient. An object database stores objects on a computer disk. Since the information on a computer disk remains in existence, even when the computer is turned off, an object database provides the ability to persistently store objects. An object program that uses an object database thus has the option of storing objects transiently or persistently.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. But, if the customer opened multiple accounts, the customer's name and address would appear in multiple account objects. Therefore, it is desirable to define a separate customer object and place the name and address as attributes of the customer object. The customer account object would then contain a reference to the customer object.

Figure 2:
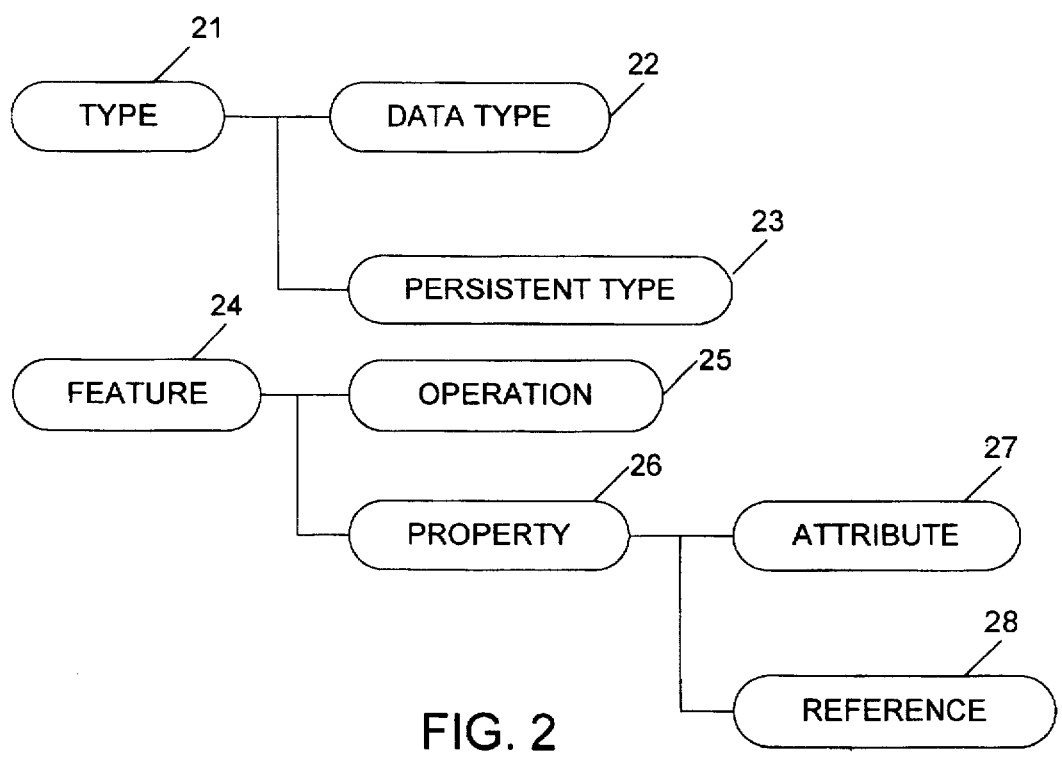
FIG. 2 is an organization chart amplifying the breakdown of elements of a schema into types and features, and their constituents.

With reference to FIG. 2, the object types of the database schema are shown. A type 21 is a template that describes a set of features (the state and behavior) that an object or another type can possess. A type 21 defines a pattern that can be used to create or identify objects; it does not contain the actual object. A database schema is defined by a hierarchy of data types 22 (also referred to as transient types) and persistent object types 23. Transient types 22 define values of attributes stored in a database. Next are features 24 which are categorized into operations 25 or properties 26. A feature defines some element of either the state or the behavior that objects can possess. A feature is defined for a type, but applied to the corresponding objects. In other words, a type defines the layout of the data for the objects, and objects are instances of the type. Properties define a state. For example, the salary feature is a property that defines an employee's current salary. Operations define behavior. For example, the setsalary feature is an operation that defines the mechanism for changing an employee's salary. The properties 26 are categorized as attributes 27, whose values are embedded within the owning objects, and references 28, whose values are independent objects.

Example

Figure 3:
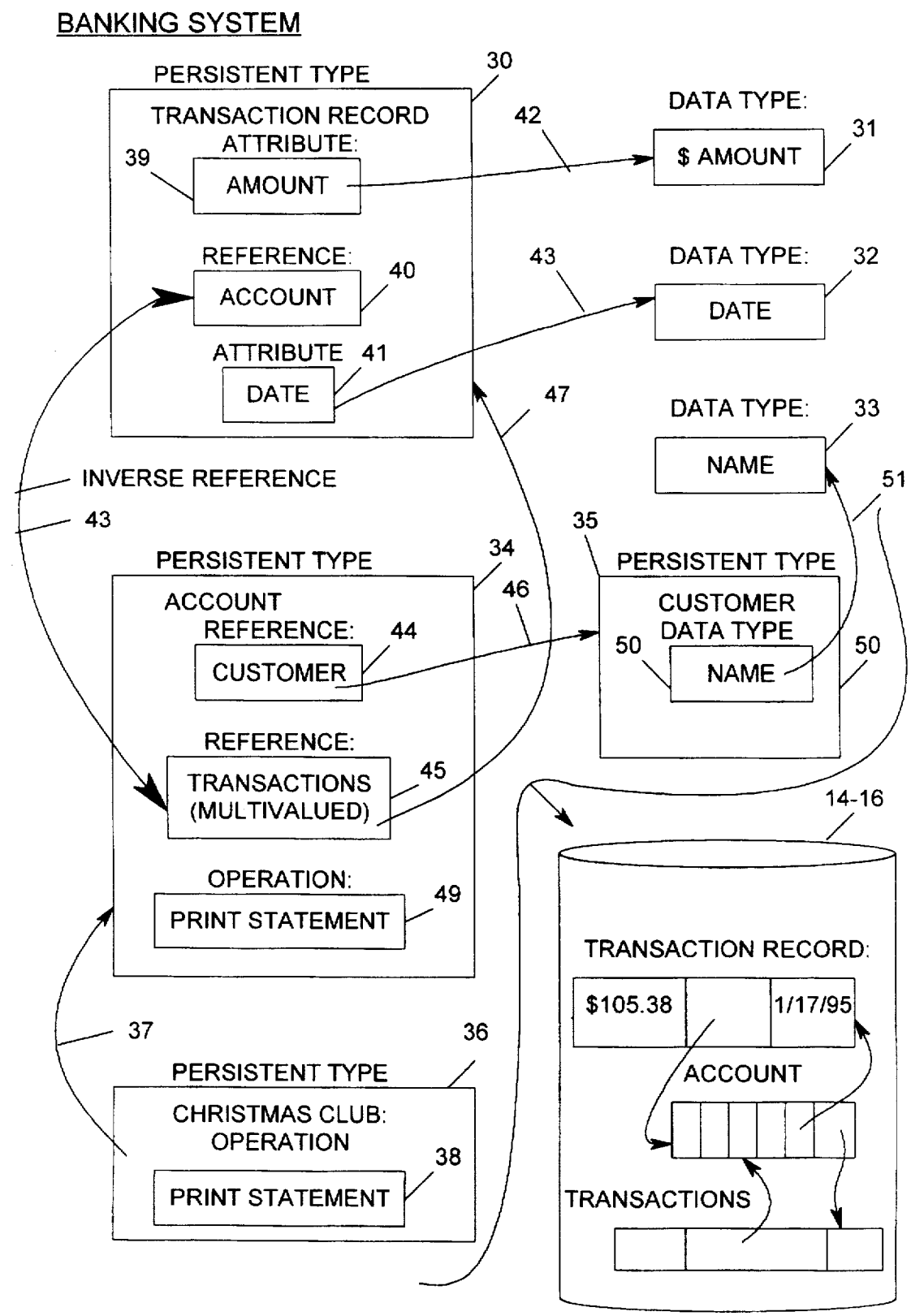
FIG. 3 is a conceptual diagram of a schema of a banking system useful in illustrating the method of the present invention.

Referring now to FIG. 3, a conceptual diagram of a schema of a banking system is provided for help in illustrating the method of the present invention. To begin with, several types, both data and persistent, are created. For example, a persistent type 30 is created for a Transaction Record. Three data types 31, 32 and 33 are created for $ Amount, Date and Name, respectively. Another persistent type 34 is created for Account. Yet another persistent type 35 is created for Customer. Still another persistent type 36 is set up for a special account such as Christmas Club, which account is a subtype of Account 34 and is linked thereto by a pointer 37. The persistent type 36 includes an operation 38 for execution of a print statement operation.

Within the persistent type 30 for Transaction Record, attributes 39 and 40 are created for Amount and Date, respectively. Also, a reference 41 is established for Account. The attribute 39 for Account is linked to the data type 31 for $ Amount by a pointer 42. In a like manner, attribute 40 for Date is linked to the data type 32 by a pointer 43. These pointers will be explained in greater detail hereinafter. Within the persistent type 34 for Account, references 44 and 45 are created for Customer and Transactions, respectively.

The reference 44 is linked to the persistent type 35 for Customer by a pointer 46; and, the reference 45 is linked to the persistent type 39 by a pointer 47. The reference 45 for Transactions is linked to the reference 40 within Transaction Record by a pointer 48. Inversely, the reference 40 is linked back to the reference 45 by the same pointer 48. Thus, this relationship is referred to herein as an inverse reference. Also within the persistent type 34 an operation 49 is created for Print Statement.

Within the persistent type 35 for Customer, a data type 50 is created for Name. The data type 50 is linked to the data type 33 for Name by a pointer 51.

When a transaction within the banking system takes place the amount thereof is entered into the attribute 39 from the data type 31; and, the date is recorded into the attribute 41 from the data type 32. The Customer name is entered into the reference 44 from the data type 50 within the persistent type 35; and, the amount, the account number and the date of the transaction is entered into the reference 45 from the persistent type 30-Transaction Record. Note that the reference 45 in this model is multivalued since many transaction records will be made for a particular account.

When a statement is to be printed for accounts, then the print statement operation 49 within the persistent type 34 and operation 38 within the persistent type 36 will be executed.

The transaction recorded within the databases 14, 15 or 16 appears as shown. That is, the dollar amount of the transaction is recorded along with the account number, the date and the transaction.

Overview of Object Databases

An examination of the currently available object databases reveals that a variety of means is provided to access features of the objects they contain. There are two prevalent means for an application program to access the properties of an object, which will be referred to as "object image" method and "generic function" method within this discussion. There are also two prevalent means to invoke the operations on an object, which will be referred to as the "native C++" method and the "router" method.

When a program asks for an object from a database that uses the object image method, the database will read the object's state from disk and build in the memory of the computer an exact image of the object as if the object were a transient C++ object, also referred to herein as a surrogate object. The database gives a pointer to this object to the C++ program which then accesses the properties of the object directly in memory without going through the database. The values of the attributes are stored in the memory object and can be directly manipulated by the program. The values of the references are typically stored as an embedded database object that provides the database with sufficient information on how to obtain the objects referenced therein.

Figure 4:
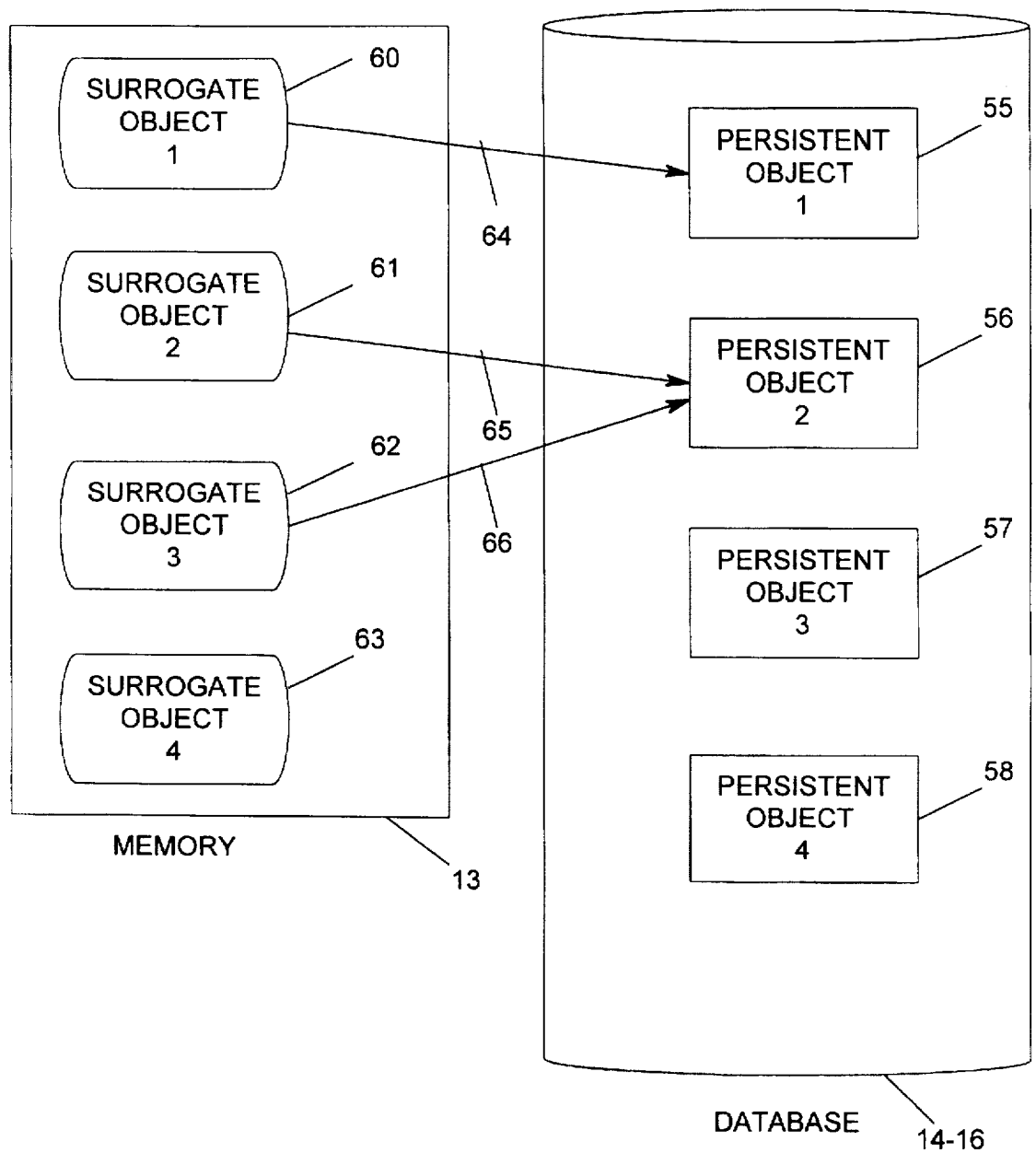
FIG. 4 is a diagram illustrating the relationship of persistent objects in a database and surrogate objects in memory, which diagram is useful in understanding the operation of the method of the present invention.

The diagram shown in FIG. 4 illustrates the above-described relationship between persistent objects 1–4 (reference numbers 55–58, respectively) stored in one of the databases 14, 15 or 16; and, surrogate objects 1–4 (reference numbers 60–63, respectively) stored within the memory 13. The C++ language binding cannot provide direct access to the persistent objects 55–58. Instead, C++ classes that correspond to persistent types, provide an interface to the persistent objects 55–58. The corresponding C++ classes are called surrogate classes (such as surrogate objects 60–63). The surrogate classes provide all access to the persistent classes (such as persistent objects 55–58), including application software running on the system 10.

It is noted that access to persistent objects must occur only during a transaction. It is also noted that a surrogate object is not the same as a persistent object; instead it is a reference to a persistent object. Surrogate objects can refer to only one persistent object at a time, such as reference 64 between surrogate object 60 and persistent object 55. However, two or more surrogate objects can refer to the same persistent object, such as reference 65 between surrogate object 61 and persistent object 56 and reference 66 between surrogate object 62 and the same persistent object 56. Moreover, surrogate objects can exist without referencing objects, such as surrogate object 63.

When a program asks for an object from a database that uses the generic function method, the database will simply return a handle to the program. A handle is a database defined object that can be used by the program to identify an object to the database. To manipulate the properties of the object, the program calls database defined functions, passing the object handle. These functions allow the program to obtain property values or change the values. If an attribute value is requested, the actual value is returned. If a reference value is requested, a handle is returned.

If a database uses the native C++ method for operation invocation, the database does not participate in any way in the operation. Rather, all operation handling is done by the C++ compiler. A database that uses the router method for operation invocation provides a router function that the program calls. The program passes the necessary information to identify the object, operation, and parameters to the operation. The router function then determines the correct operation to call, based on the type of the object, the operation identified, and the parameters given.

Description of one Embodiment: Defining a Model

The method of the present invention defines a surrogate object to represent the database object, using the C++ class definition facility. The method defines a set of member functions on the surrogate class that can be used to manipulate the properties of the database object. These member functions are known as accessors, which are member functions used to obtain information about the property, and mutators, which are member functions used to update the value of the property. The method also defines member functions used to invoke the operations defined on the database object. The member functions of the surrogate class contain database specific code to provide proper access to the database object. Thus, when moving from one object database to another, only the surrogate member functions have to change. However, any C++ program written using the surrogate classes is guaranteed database independence since they contain no database dependent code.

The implementation of this invention employs a text file that contains a database independent description of the database objects. A program reads this text file and generates both the surrogate class declarations and the implementations for the surrogate class member functions.

Additional definitions that may be helpful in understanding the present invention are Friend and Friends of Classes. A function declared without the Friend specifier is known as a member function of the class. Functions declared with the Friend modifier are called Friend functions. A Friend F of a class X is a function or class that, although not a member function of X, has full access rights to the private and protected members of X. In all other aspects, F is a normal function with respect to scope, declarations and definitions. Also, the terms Public, Private and Protected are used in this description as follows. Public refers to things that the entire program can see, and the member can be used by any function. Private refers to a member that can be used by member functions and friends of the class in which it is declared. Members of a class are private by default. Protected refers to members that cannot be seen in general but can be seen by a class and its subclass. Protected is the same as private, but additionally the member can be used by member functions and friends of classes derived from the declared class, but only in objects of the derived class.

The Database Class

The database class provides general database functionality, such as opening and closing the database, and beginning and ending database transactions.

The database class is defined as follows:

```
class DB
{
public:
    // Constructor and destructor for DB class:
    DB();
    ~DB();
    // Functions used to open and close the database:
    int open(char* databaseName);
    int close();
    // Functions used to begin and end transactions:
    int beginTransaction(int writeMod = 0);
    int endTransaction(int abort = 0);
}
```

The Surrogate Class

For each database object type, a surrogate class is defined. These surrogate classes contain no data (or instance variables as known in C++ terminology), but only member functions. These surrogate classes inherit either directly or indirectly from a class called Surrogate. This class contains information that is used to identify the database object. Therefore the Surrogate class is database dependent, and each database requires its own definition of the Surrogate class.

The Surrogate class contains the following information:

```
class Surrogate
{
public:
    // Default and copy constructor and destructor:
    Surrogate();
```

```
        Surrogate(const Surrogate& _other);
        virual ~Surrogate();
        // Functions that indicate if the surrogate
    oject is linked to a
        // database object:
        int isNull() const;
        int isValid() const;
    private:
        // Pointer to a database dependent structure that
    identifies the
        // database object:
        Handle* databaseObject;
    }
```

Consider a database schema consisting of a Person type and its subtype, the Employee type. The corresponding surrogate type are declared as follows:

```
        class sPerson: public Surrogate
        {
            ...
        }
        class sEmployee: public sPerson
        {
            ...
        }
```

The constructor for a surrogate class requires that the database class be known to it. To provide the ability to have multiple databases open, the pertinent database class is passed to the constructor of the surrogate class. For example, assume an employee object, whose type is called Employee in the database. The Employee type inherits from the Person type, also defined in the database. The surrogate class, including the constructor, is defined as:

```
        class sEmployee : public sPerson
        {
            ...
            sEmployee(DB& db);
            sEmployee(eEmployee& other);
            ...
        }
```

Note that the copy constructor does not require the database class instance to be passed since the information about the database is already present in the surrogate passed by the parameter "other".

The Collection Template

A property can be defined as being either single-valued or multi-valued, which is known as the cardinality of the property. For a single-valued property, only one value exists for the property for any given object. For example, the current salary attribute of an employee object or the department reference of an employee object each have only one value. For a multi-valued property, many values can exist for the property of a given object. For example, the children's names attribute for the employee object or the projects working on reference for an employee object can have multiple values.

To implement multi-valued properties, a database independent template collection class, called Collection is defined. Use of this template permits operations to return collections of objects, and allows for parameters of operation to be collections of objects. This template is defined as follows:

```
    template <class Cls> class Collection
    {
    public:
        // The constructors and destructor:
        Collection();
        Collection(const Collection& _other);
        ~Collection();
        // Function to retrieve an object from the given zero-
    relative
        // location in the collection:
        Cls operator[] (int _location) const;
        // Function to add a new object to the collection:
        void add(const Cls& _object);
        // Function that determines if a given object is the
    collection:
        int contains(const Cls& _object) const;
        // Function that removes all objects from the
    collection:
        void flush();
        // Function that indicates if the collection is empty:
        int isnull() const;
        // Function to remove one or all occurrences of a
    specific object
        //from the collection:
        void remove(const Cls&, _object, int allOccurances =
    0);
        // Function to remove an object at the given zero-
    relation location
        // from the collection:
        void remove(int _location);
        // Function that returns the number of objects in the
    collection:
        int size() const;
    }
```

The member functions of the collection template provide type-safe access to the members of the collection.

The Property Accessors and Mutators

The exact accessors and mutators defined for a property depend on the cardinality of the property. The following table lists the accessors and mutators available for a property, gives a brief description of the use of the accessor or mutator, indicates whether the function is an accessor or mutator, and indicates for which cardinality the function is valid. In the table, the metatoken <property> represents the name of the property, and the metatoken <type> represents the value type of the property.

TABLE 1

Accessor and Mutator Functions

| Function | Description | Type | S V | M V |
|---|---|---|---|---|
| <type> get_<property> () const | Obtains the value of a property. | Accessor | Y | Y |
| <type> get_<property> (int _location ) const | Obtains a single value from a multivalued property. The value to be obtained is passed by the argument location. The location is relative to zero (0). | Accessor | N | Y |
| int contains_<property> (const <type>& _value ) const | Determines if the passed argument, value, is one of the values of a multi-valued property. The modifier const on the value parameter is used only for references. | Accessor | N | Y |
| int | Returns the number of | Accessor | N | Y |

TABLE 1-continued

Accessor and Mutator Functions

| Function | Description | Type | SV | MV |
|---|---|---|---|---|
| size_<property> () const | values of the multi-valued property. | | | |
| int isNULL_<property> () const | Indicates whether there are any values for the property. | Accessor | Y | Y |
| void set_<property> (const <type>& _value ) | Sets the property to the value passed. The modifier const is used only for references. | Mutator | Y | Y |
| void add_<property> (const <type>& value ) | Adds the passed value as a value for the multivalued property. The new value is added after the existing values for the property. The modifier const is used for references. | Mutator | N | Y |
| void remove_<property> (const <type>& _value ) | Removes the passed value as a value from the multivalued property. The modifier const is used only for references. | Mutator | N | Y |
| void removeLoc_<property> (int _location ) | Removes a value from a multivalued property. The removed value is indicated by the passed argument location. The location is relative to zero (0). | Mutator | N | Y |
| void flush_<property> () | Resets the property so that is has no value | Mutator | Y | Y |

For example, assume an employee object, whose type is called Employee in the database. The Employee type inherits from the Person type, also defined in the database. The Employee type has the following properties:

salary, attribute of data type float, single-valued projects, reference of type Project (another database type), multi-valued etc.

The corresponding surrogate class declaration for this database type appears as follows. The lower case letter "S" is prepended to the surrogate class name to differentiate it from the database class name.

```
{
...
// salary: float, sv
float get_salary() const;
int isnull_salary() const;
void set_salary(float _value);
void flush_salary();
//projects: Project, mv
Collection<sProject> get_projects() const;
Sproject get_projects(int _location) const;
int contains_projects(const Sproject& _value) const;
int size_projects() const;
int isnull_projects() const;
void set_projects(const Collection<Sproject>& _value);
void add_projects(const sProject& _value);
void remove_projects(const sProject& _value);
void removeLoc_projects(int _location);
void flush_projects();
...
}
```

The above example is amplified in the process illustrated in FIGS. 7a, 7b and 7c and discussed further hereinafter.

Property Constraints

A property can be defined as being either public, read only or private. For public properties, the accessors and mutators appear in the public section of the surrogate class definition. For read only properties, the accessors appear in the public section while the mutators appear in the private section of the surrogate class definition. For private properties, the accessors and mutators appear in the private section of the surrogate class definition.

For example, the salary property of the Employee can be declared as private, thus restricting the accessors and mutators to the private section of the The Operation Member Functions The mapping of an operation to the surrogate class involves several parts. First, the operation is implemented as a stand-alone function (called a method), not as a member function of any class. This method has the surrogate object passed as the first parameter, and uses the surrogate classes to update the database. Second, a member function for the operation is declared in the surrogate class. This member function accepts the same parameters and returns the same results as the operation. Third, the method is declared a friend of the surrogate class.

For example, the raisesalary operation, which takes the amount by which to raise the salary, is defined in the surrogate class as follows:

```
{
...
// raiseSalary:
void raiseSalary(float amount);
friend void raiseSalary(sEmployee& myself, float amount);
...
}
```

The method that implements the raiseSalary operation is defined as follows:

```
void raiseSalary(sEmployee& myself, float amount)
{
myself.set_salary(myself.get_salary() + amount);
}
```

The above example is amplified in FIGS. 9a, 9b and 9c and discussed further hereinafter.

Static Operations

A static operation operates on the class rather than on an individual instance of the class (object). It is not necessary to first construct or obtain an object before calling a static operation. A static member function is declare in the surrogate class for each static operation defined for a persistent object. The static function follows much the same algorithm as given for regular operations, with the exceptions that the member function is declared as static and with an extra parameter—a reference to the DB class.

For example, consider the find static operation of the employee class. This operation takes an employee number and returns the employee object. It would be declared in the surrogate class as follows:

```
class sEmployee : public sPerson
{
    ...
    // find: float
    static sEmployee find(BD& db, int employeeNumber);
    ...
}
```

The Database Object Constructors and Destructor.

The constructors and destructor for a surrogate object operate only on the surrogate object, not on the database object. Two constructors are provide: a default constructor that accepts no parameters and a copy constructor. For example, the constructors and destructor for the surrogate class for the Employee type appear as follows:

```
class sEmployee : public sPerson
{
    ...
    sEmployee();
    sEmployee(const sEmployee& _other);
    virtual ~sEmployee();
    ...
}
```

The above example is amplified in FIG. 6, which process is discussed further hereinafter.

It is necessary to map the database object constructors and destructor to member functions of the surrogate class. These member functions are called "construct" for the constructors, and "destruct" for the destructor. The construct and destruct member functions are considered to be static member functions of the surrogate class, returning a surrogate object for the database object created. These functions actually create a new For example, the Employee type has a constructor that requires an employee name and accepts an optional employee number as parameters. The surrogate class for the Employee type is declared with the following construct and destruct member functions:

```
class sEmployee : public sPerson
{
    ...
    static sEmployee construct(DB& db, char* name, int number = 0);
    void destruct();
    ...
}
```

The above example is amplified in FIGS. 8a, 8b and 8c and discussed further hereinafter.

Type Checking and Type Casting

The Surrogate class declares a type-checking function that is used to determine the actual database object type of the surrogate object. In addition, it contains a type identification function that returns the name of the database type associated with the database object. These functions are declared as follows:

```
{
    ...
    // The type-checking function:
```

```
    int isA(const char* databaseTypeName) const;
    // The database type name function:
    const char* typeName() const;
}
```

The type-casting template function is used to provide safe type conversion when converting a surrogate object of one type to another. The type-casting function has the following declaration:

```
template <class DesiredType>
class Cast
{
public:
    static DesiredType cast(const Surrogate& myself);
}
```

To aid in programming, the following defined is declared:

define CAST(desired,object) Cast<desired>::cast(object)

For example, the find operation presented in a previous example returns a surrogate employee object. However, since managers are employees, the actual database object linked to the returned employee surrogate object might be a manager. The following code first checks to see if the returned object is actually a manager, and if it is, safely casts the employee surrogate object to a manager surrogate object:

```
sEmployee emp = sEmployee.find(123);
if ( emp.isA("Manager")  )
{
    sManager mgr = CAST(sManager, emp);
    ...
}
```

Polymorphism

If an operation is called on an object, the surrogate member function for that object is invoked. The implementation for the surrogate member function must determine how to properly route that operation call to the correct method based on the actual database object type. It is possible that the called operation is overridden in the subtype that the database object actually belongs to. This ability to override an operation in a subtype, and the ability to properly route operation calls to the method is called polymorphism.

For example, both the Employee and Manager types could have an operation called giveRaise defined. If the program has an employee surrogate object linked to a manager database object, it is imperative that the giveRaise method for the manager database type is invoked, not the giveRaise method for the employee database type.

This is accomplished in a somewhat database dependent means in the implementation of the member functions in the surrogate class. If the database contains an operation router, and that router supports properly supports polymorphism, then the router is simply called to do the work. If the router does not handle polymorphism, or there is no router, an alternate tack must be taken.

First, the surrogate object must keep track of whether this is the first call to the operation. Therefore, a flag for this is declared in the Surrogate class:

```
class Surrogate
{
    ...
    private:
        // Flag that determines if this is first call to
        operation:
            int restricted;
}
```

Second, for each surrogate class declared, member functions that restrict themselves to a superclass of the given class are declare. For example, the sManager class has the sEmployee class as a superclass, so it would have the following member function declared:

```
class sManager: public sEmployee
{
    ...
    protected:
        sEmployee restrictTo_Employee( ) const;
}
```

The above example is amplified in FIG. 10 and discussed further hereinafter.

Note that after calling the restictTo_<supertype> function that both the surrogate object passed and the surrogate object returned by the function are linked to the same database object.

Third, the method writer must use the following convention when invoking the overridden method in the parent class: first, the passed object must be restricted to its superclass, and second, the overridden function is called on the restricted surrogate. Continuing the giveRaise example, the method would contain the following code:

```
void giveRaise(const sManager myself, float amount)
{
    ...
    // Call overridden operation in Employee type:
    sEmployee emp = myself.restrictTo_Employee( );
    emp.giveRaise(amount);
    ...
}
```

Fourth, the implementation of any member function checks the restricted flag. If it is set, the method is called directly. If it not set, the operation is either passed to the database router, if there is one, or passed to the member function of the database object, if the database uses C++ routing rather than its own router. For example, the sEmployee::giveRaise member function is implemented as follows:

```
void sEmployee::giveRaise(float amount)
{
    ...
    if ( restricted )
        giveRaise(this*, amount);
    else
        <invoke operation through database>
    ...
}
```

When a program calls giveRaise for an employee surrogate object that is linked to a manager, the flow of operations is as follows:

1) the employee surrogate member function: sEmployee::giveRaise(float)

2) the manager method: giveRaise(const sManager&, float)

3) the employee surrogate member function: sEmployee::giveRaise(float)

4) the employee method: giveRaise(const sEmployee&, float)

Notice that the employee surrogate member function is called twice. On the first call the restricted flag is not set so the manager giveRaise method is called. The second time the employee surrogate member function is called for a restricted object so the employee giveRaise method is called. If the restricted flag were not set, the program would go into an endless loop repeatedly calling the employee member function and manager method.

Figure 5:
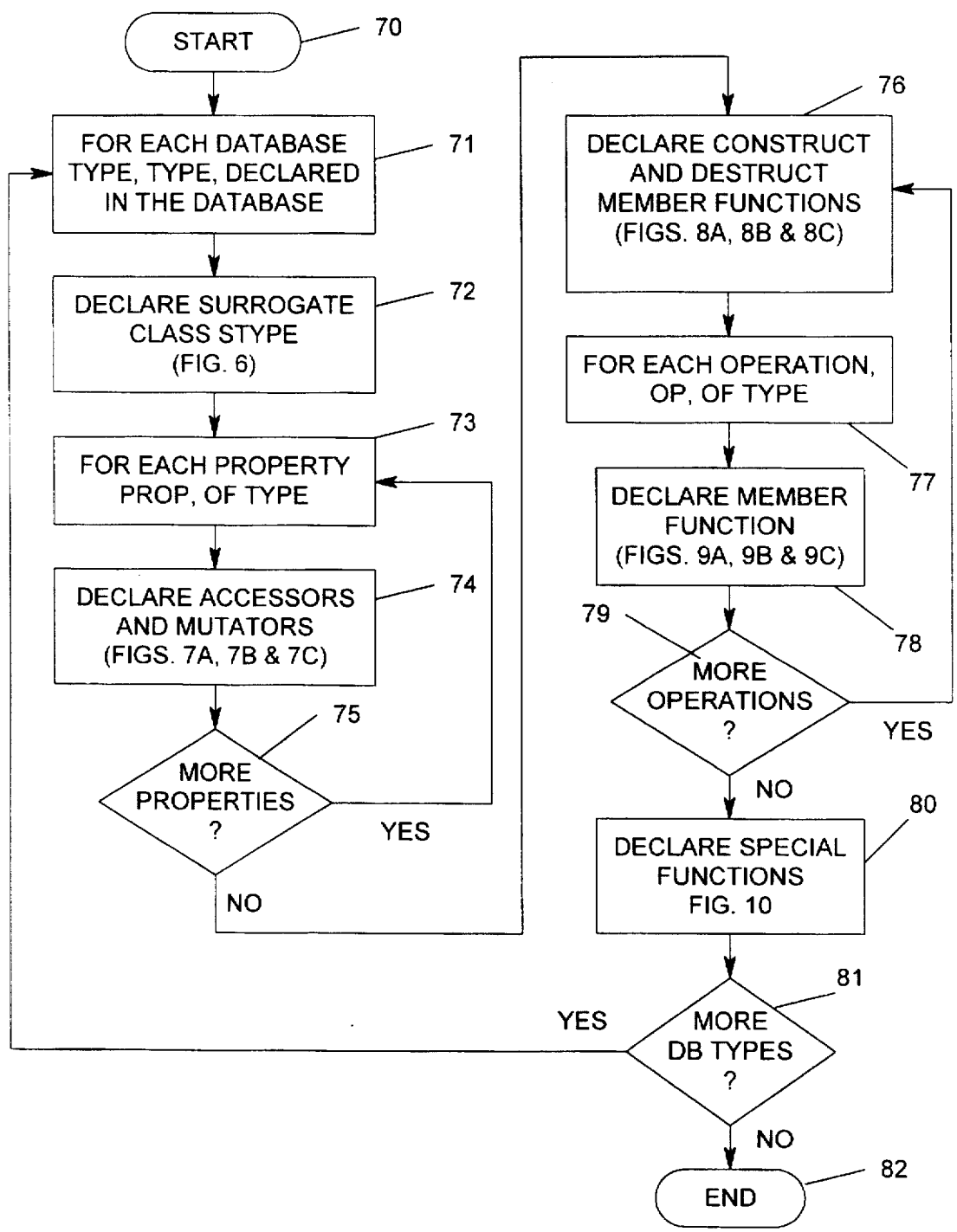
FIG. 5 is an overall flow chart illustrating operation of the method of the present invention.

Referring now to FIG. 5, an overall flow chart illustrating operation of the method of the present invention. The process begins with a start bubble 70 followed by a repetitive process block 71. That is, for each database type, referred to herein as TYPE, the process is iterated for those TYPES declared in the database. Next, a step of declaring surrogate class sTYPE is performed as depicted by a process block 72. It is pointed out that convention of using a lowercase "s" preceding the term TYPE refers to the surrogate class. Details of the step of declaring surrogate class is illustrated in FIG. 6, which will be explained further hereinafter. This step is followed by another repetitive process step block 73, which processes each property PROP of TYPE as described hereinafter.

Next, for each property PROP of TYPE, a step of declaring accessors and mutators is performed as depicted by a process block 74. It is noted that the terms "accessors" and "mutators" refer to member functions that manipulate property values. Accessor and mutator functions are declared in the class declaration that corresponds to the database type to which the property belongs. An accessor function obtains the value of a property. A mutator function modifies the value of a property. Accessor and mutator functions can also access the properties of a transient class. Details of the step of declaring accessors and mutators are illustrated in FIGS. 7a, 7b and 7c, which will be explained in greater detail hereinbelow.

An inquiry is next made as to whether or not there are more properties, as illustrated by a decision diamond 75. If the answer to this inquiry is yes, then a return is made back to the process block 73 for the next property. On the other hand if there are no more properties, then a branch is taken to yet another process step of declaring construct and destruct member functions as depicted by a process block 76. The construct method corresponds to the constructor for a C++ class. Every persistent type must have a defined construct operation. Therefore, a construct method must be written for each type in a schema. The destruct method corresponds to the destructor for a C++ class. This method is needed if there are constraints on removing a persistent object from the database or cleanup must be done before a persistent object can be deleted. Otherwise, no destruct operation or method is needed. Details of the construct and destruct operations are shown in FIGS. 8a, 8b and 8c, which will be explained in greater detail hereinbelow.

Another repetitive step is performed for each operation OP of TYPE is performed (process block 77). The operation of a type are declared as member functions of the corresponding C++ class. Thus, the next step is declaring member functions as depicted by a process block 78. The details of this process step are illustrated in FIGS. 9a, 9b and 9c, which are explained in greater detail hereinbelow. Following this step an inquiry is made as to whether or not there are more operations (decision diamond 79). If there are more operations a return is made back to the process block 77 for subsequent processing. On the other hand, if there are no more operations then another process step is performed of declaring special functions (process block 80). Details of this process step are illustrated in FIG. 10, which is explained in greater detail hereinafter.

After the above steps have been performed an inquiry is made as to whether or not there are more types as depicted by a decision diamond 81. If there are more types, a return is made back to the process block 71 for processing of the next type. On the other hand if there are no more types then this process is exited as depicted by an End bubble 82.

Figure 6:
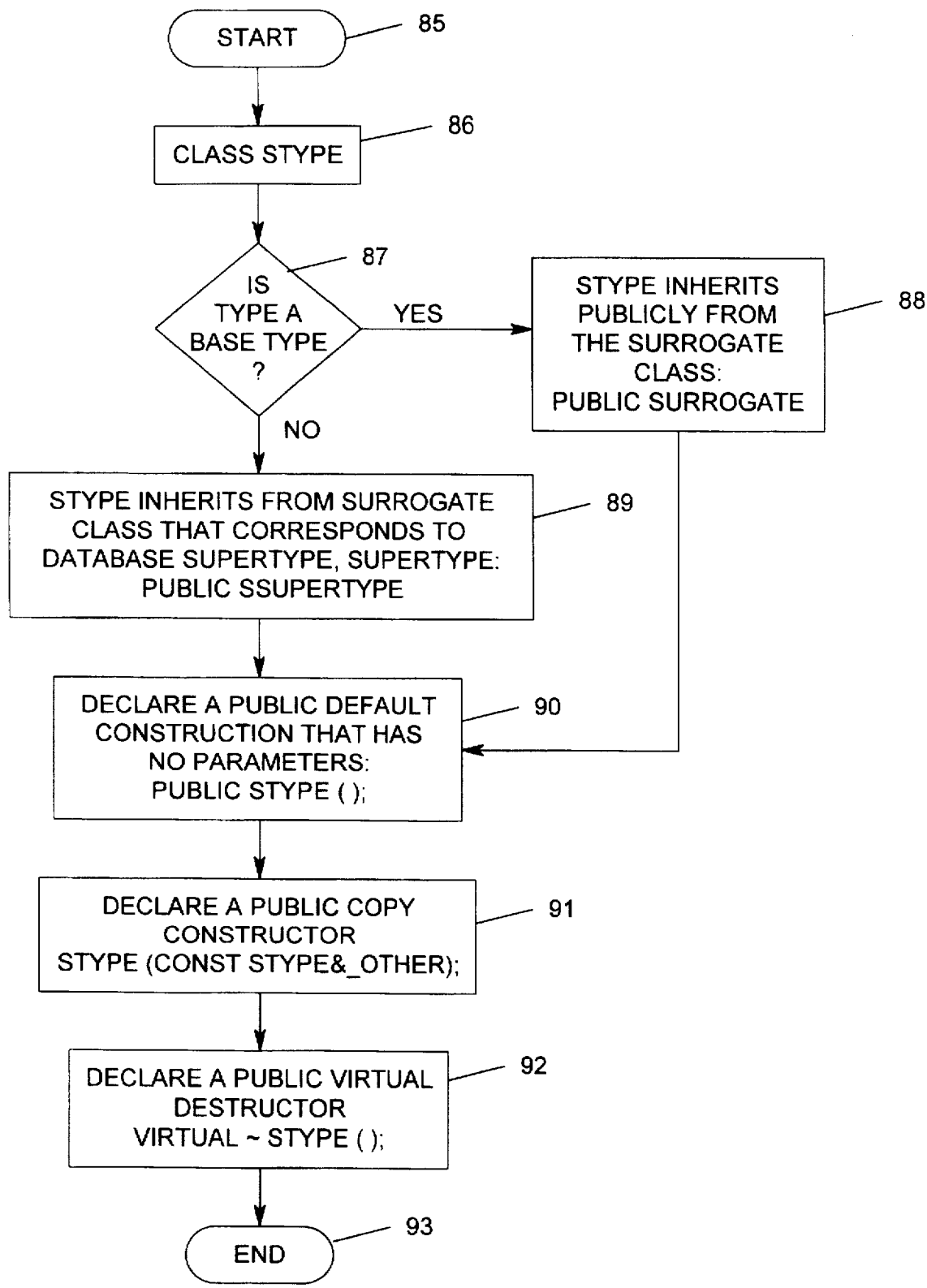
FIG. 6 is a flow chart illustrating the declaring of a surrogate class identified herein as sTYPE.

Referring now to FIG. 6, a flow chart of the process of declaring a surrogate class as sTYPE is shown, which process is generally referred to by a process block 71 in FIG. 5 above. The process begins with a start bubble 85, followed by a declaration of class sTYPE as depicted by a process block 86. Next, an inquiry is made as to whether or not TYPE is a base type (decision diamond 87). If it is a base type then sTYPE inherits publicly from the surrogate class: public surrogate (process block 88). On the other hand if it is not a base type, then sTYPE inherits from surrogate class that corresponds to database supertype, SUPERTYPE: public sSUPERTYPE (process block 89).

Following the above, a step of declaring a public default construction that has no parameters: public sTYPE ( ); is performed (block 90). It is noted that if the path through process block 88 is followed, as described above, then entry is made to block 90. Next, a step of declaring a public copy constructor sTYPE (const sTYPE&_other); is performed (block 91). After this step, another step of declaring a public virtual destructor: Virtual~sTYPE ( ); is performed (block 92). Finally, the process is exited as denoted by an end bubble 93.

Figure 7A:
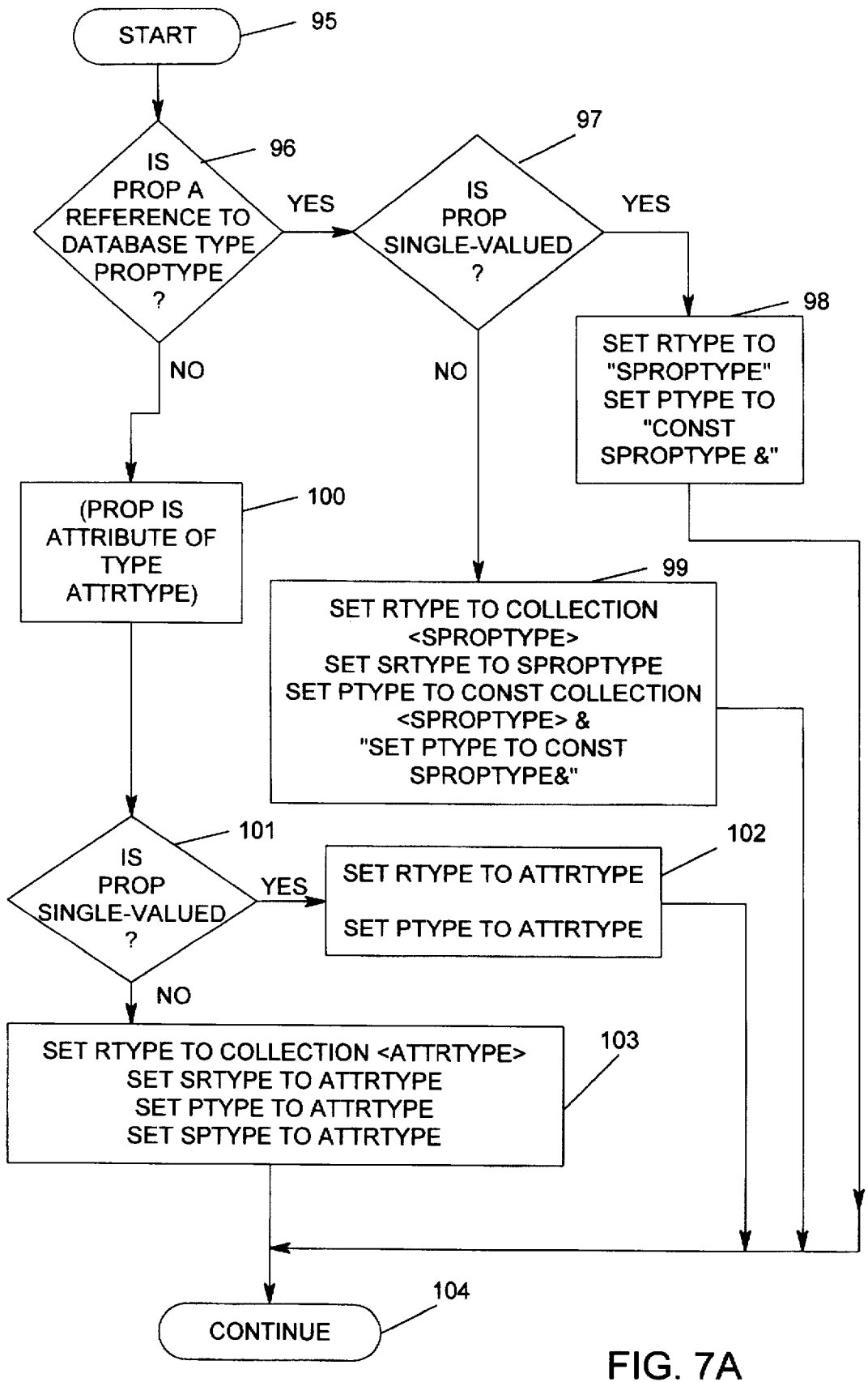
FIGS. 7a, 7b and 7c combined form a flow chart illustrating the process of declaring accessors and mutators.

Referring now to FIG. 7a, which is the first of three combined figures, a flow chart illustrates a portion of the process for declaring accessors and mutators. The process begins with a start bubble 95 followed by an inquiry as to whether or not PROP is a reference to database type PROPTYPE (decision diamond 96). If the answer to this inquiry is yes, then another inquiry is made as to whether or not PROP is single-valued (decision diamond 97). If the answer to this inquiry is yes, then a step of setting RTYPE to sPROPTYPE and setting PTYPE to const sPROPTYPE& is performed (block 98). On the other hand, if PROP is not single-valued the steps of setting RTYPE to collection <sPROPTYPE>, setting SRTYPE to sPROPTYPE, setting PTYPE to const collection <sPROPTYPE>& and setting SPTYPE to const sPROPTYPE& are performed (block 99). If PROP is not a reference to database type PROPTYPE (no leg of the diamond 96), then a step of declaring PROP as an attribute of type ATTRTYPE is performed as depicted by a block 100. Again the inquiry of whether or not PROP is single-valued is made (decision diamond 101). If PROP is single-valued, then the steps of setting RTYPE to ATTRTYPE and setting PTYPE to ATTRTYPE are performed (block 102). On the other hand, if PROP is not single-valued then the steps of setting RTYPE to collection <ATTRTYPE>, setting SRTYPE to ATTRTYPE, setting PTYPE to ATTRTYPE and setting SPTYPE to ATTRTYPE are performed as depicted by a process block 103. After the steps depicted by blocks 98, 99, 102 and 103 have been performed, the process is continued to the next diagram as denoted by a continue bubble 104.

Figure 7B:
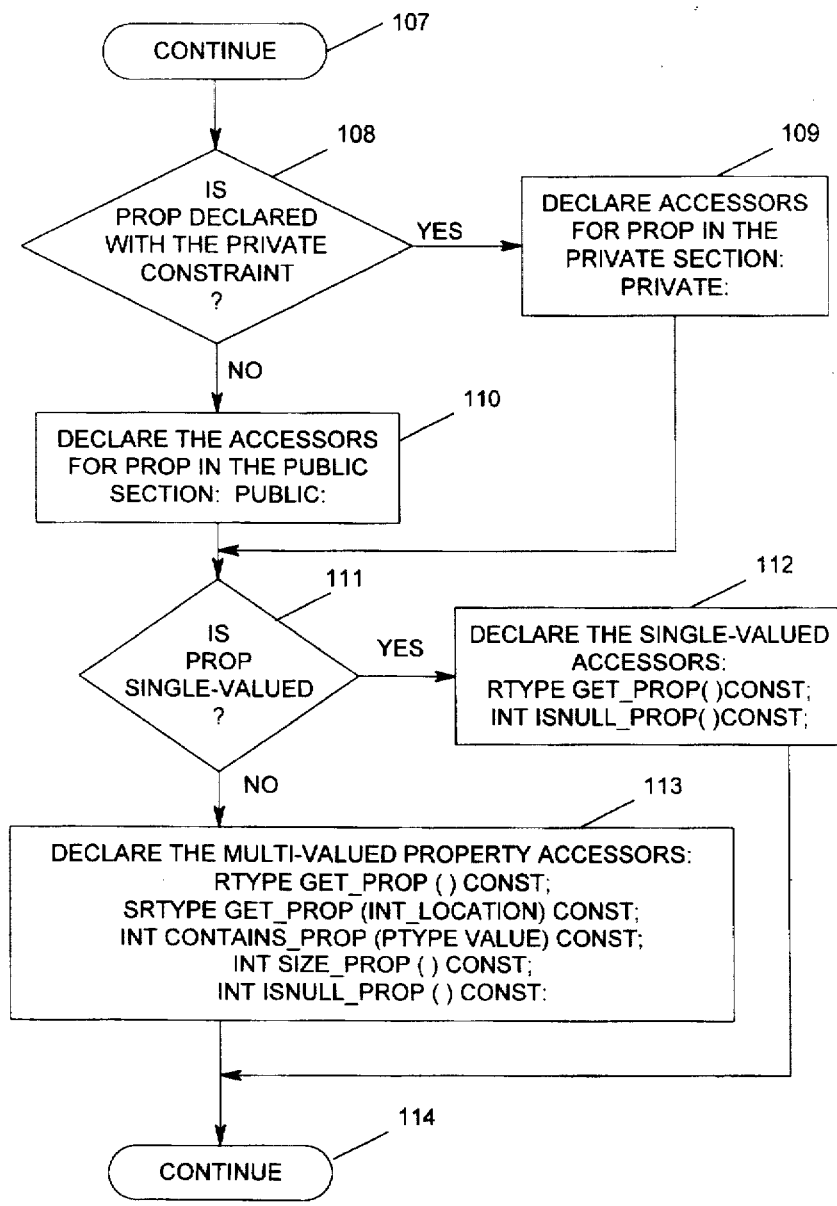

Referring now to FIG. 7b, the process continues as denoted by a continue bubble 107. An inquiry is next made as to whether or not PROP is declared with the private constraint (decision diamond 108). If the answer to this inquiry is yes, the a step of declaring accessors for PROP in the private section: private: is performed as illustrated by a block 109. On the other hand, if PROP is not declared with the private constraint, then a step of declaring the accessors for PROP in the public section: public: is performed as depicted by a block 110. Next, an inquiry is made as to whether or not PROP is single-valued (decision diamond 111). Note that once the step of block 109 is performed a branch is taken to the same diamond 111.

If PROP is single-valued, then steps of declaring the single-valued accessors: RTYPE get_PROP( )const; and int isNull_PROP( )const; are performed (block 112). On the other hand, if PROP is not single-valued then the steps of declaring the multivalued property accessors: RTYPE get_PROP( )const;, SRTYPE get_PROP (int_location) const;, int contains_PROP(PTYPE value) const;, int size_PROP( )const; and int isNull_PROP( )const; are performed as depicted by a block 113. Once the steps of blocks 112 and 113 have been performed, the process is continued as depicted by a continue bubble 114.

Figure 7C:
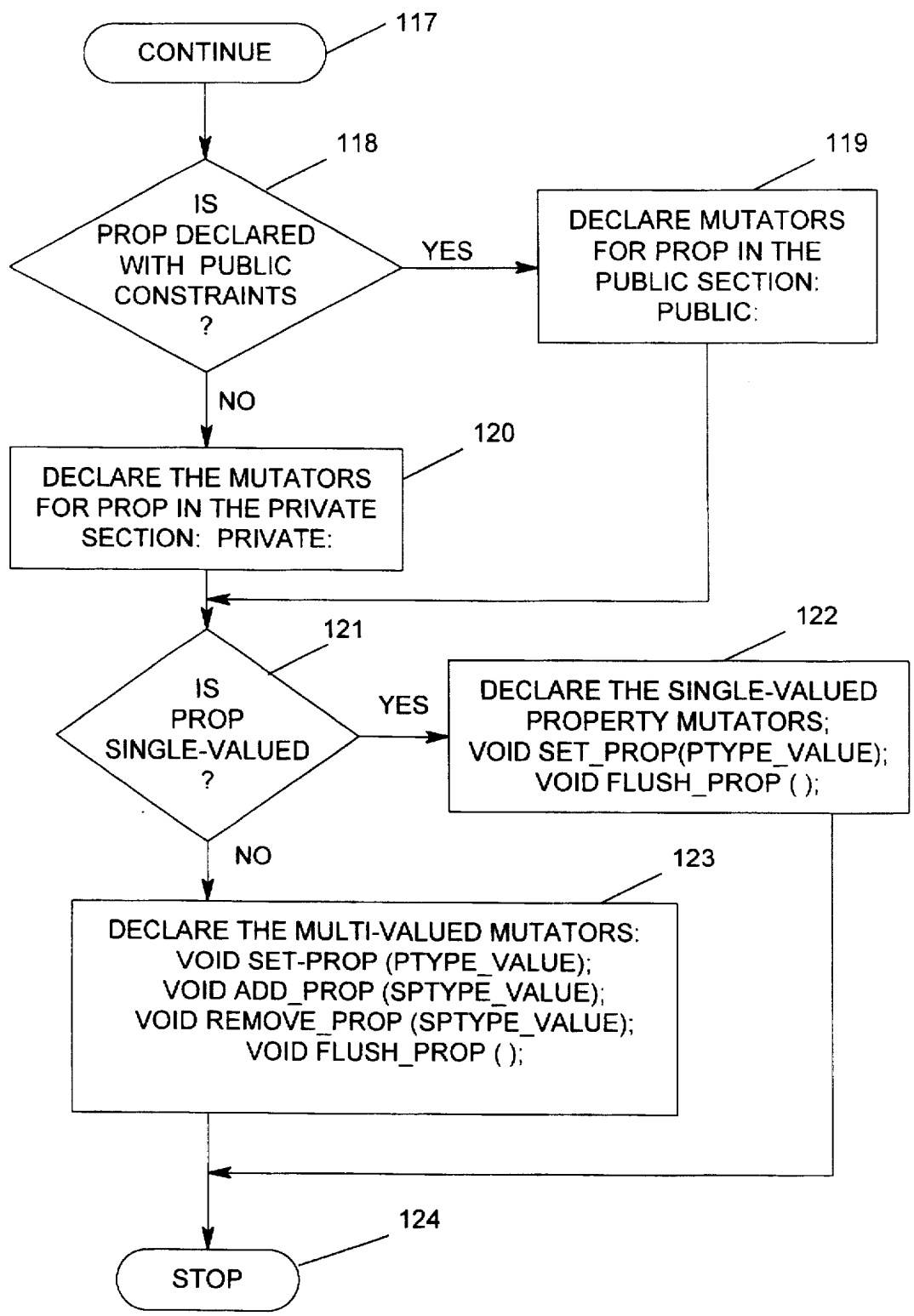

Referring now to FIG. 7c, the above-described process is continued as depicted by a continue bubble 117. Next, an inquiry is made as to whether or not PROP is declared with public constraints (decision diamond 118). If the answer to this inquiry is yes, then a step of declaring mutators for PROP in the public section public: is performed as depicted by a process block 119. On the other hand, if the answer to this inquiry is no, then a step of declaring the mutators for PROP in the private section: private: is performed (block 120). Following this, another inquiry is made as to whether or not PROP is single-valued (decision diamond 121). Note that after the step depicted by block 119 is performed, entry is also made into the diamond 121.

If PROP is single-valued, then the steps of declaring the single-valued property mutators: void set_PROP(PTYPE_value); and void flush_PROP( ); are performed (block 122). On the other hand, if PROP is not single-valued, then the steps of declaring the multi-valued mutators: void set_PROP (PTYPE_value); void add_PROP (SPTYPE_value); void remove_PROP (SPTYPE_value); and void flush_PROP( ); are performed (block 123). After the steps in blocks 122 and 123 have been performed the process is ended as depicted by an end bubble 124.

Figure 8A:
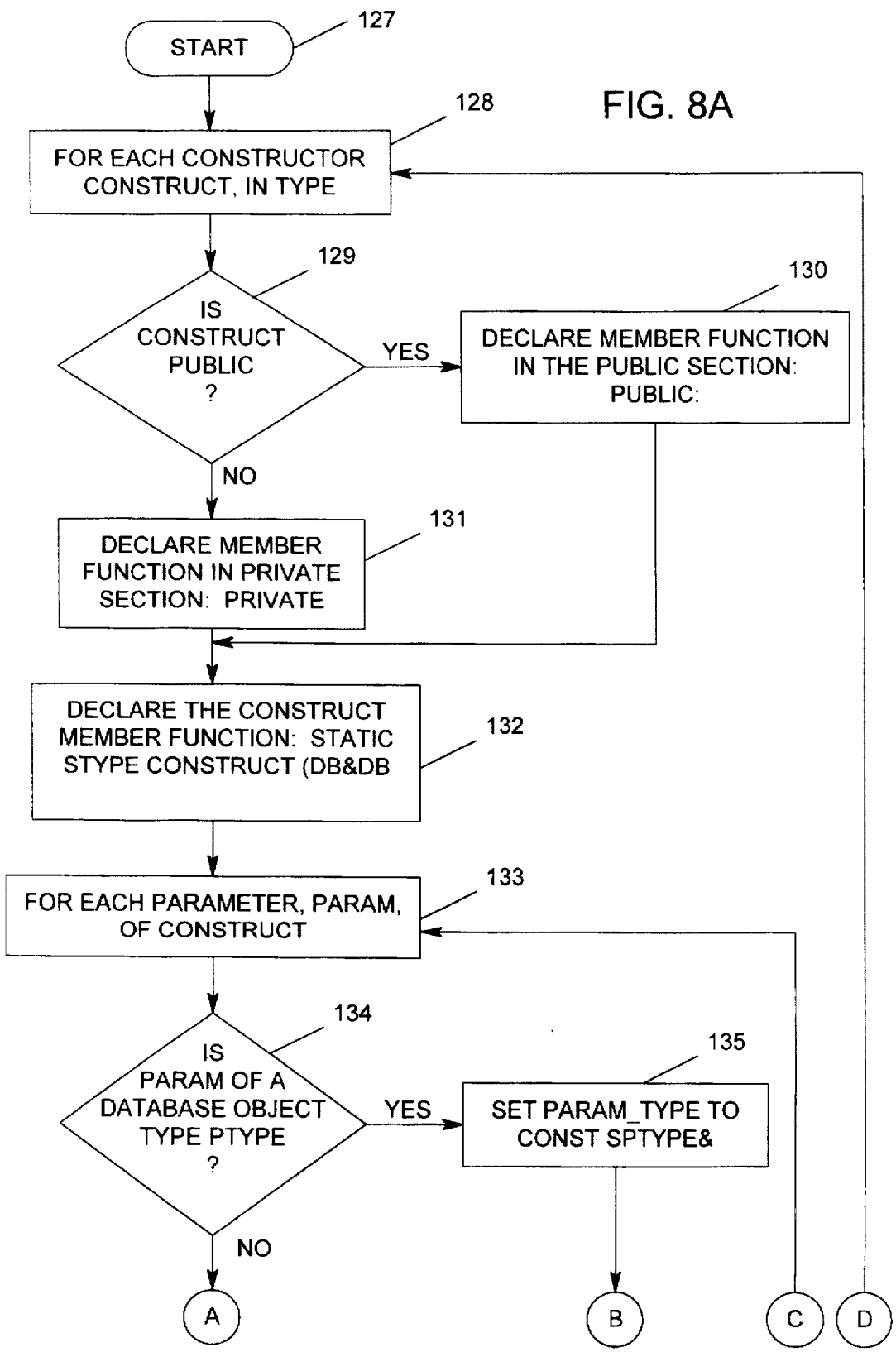
FIGS. 8a, 8b and 8c combined form a flow chart illustrating the process of declaring construct and destruct member functions.
Figure 8B:
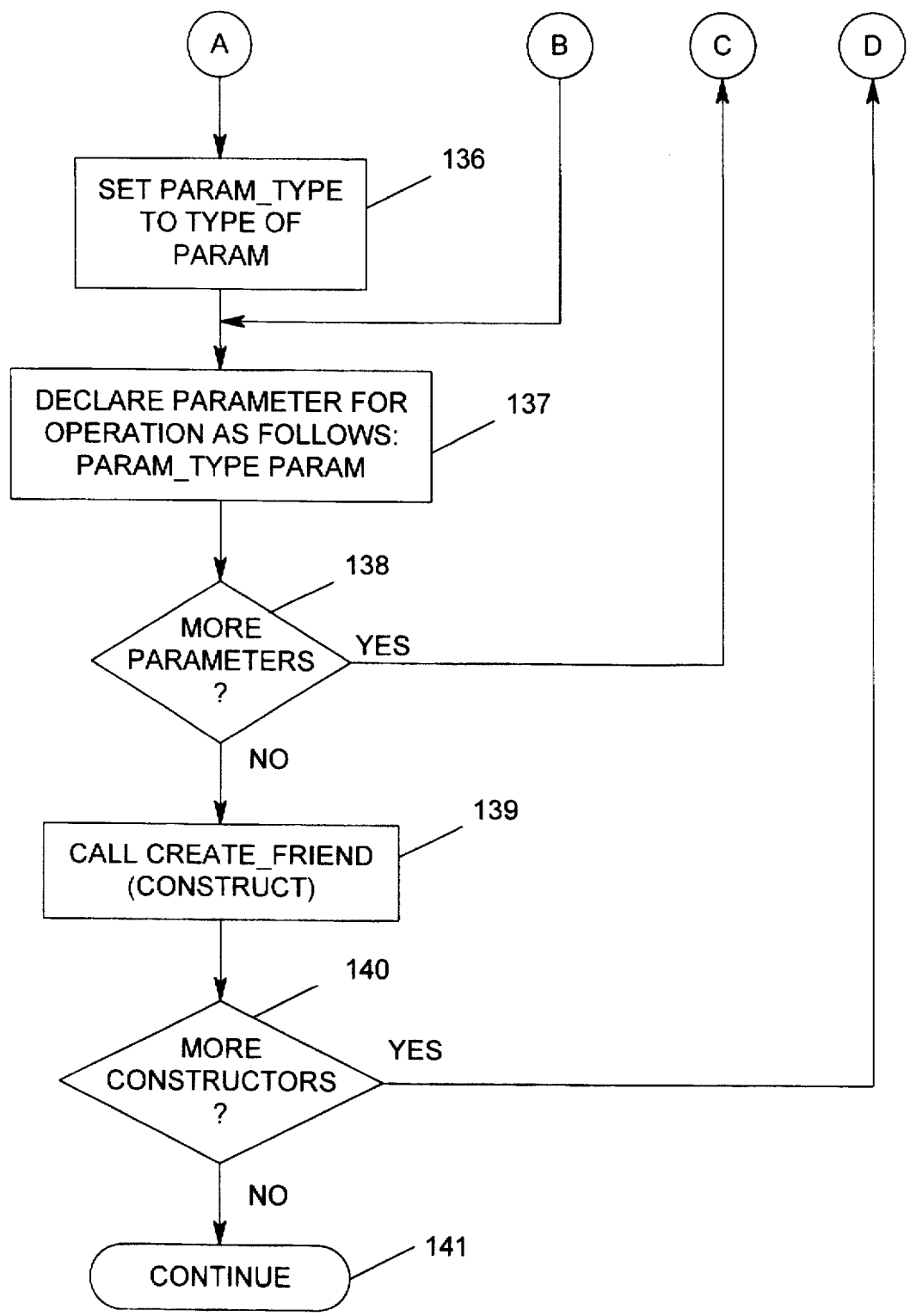

Referring now to FIG. 8a, the first of three parts of a flow chart illustrating the process of declaring construct and destruct member functions is shown. The process begins with a start bubble 127 followed by a repetitive step that is performed for each constructor CONSTRUCT, in TYPE (block 128). Next, an inquiry is made as to whether or not CONSTRUCT is public (decision diamond 129). If CONSTRUCT is public, then a step of declaring member function in the public section: public: is performed (block 130). On the other hand, if CONSTRUCT is not public, then a process step of declaring member function in section: private: as depicted by a block 131. Following this, a step of declaring the construct member function: static sTYPE construct (DB & db) is performed as represented by a block 132. Note that once the step of block 130 has been performed a branch is taken to the process block 132.

Next, for each parameter, PARAM, of CONSTRUCT repetitive step is performed as depicted by a block 133. Following this step, an inquiry is made as to whether or not PARAM is of a database object type PTYPE (decision diamond 134). If the answer to this inquiry is yes, then the step of setting PARAM_TYPE to const SPTYPE& as depicted by a process block 135. On the other hand if PARAM is not of a database object type PTYPE, then a branch is taken to FIG. 8b as denoted by a connector A. Next a step of setting PARAM_TYPE to type of PARAM (FIG. 8b) is performed as illustrated by a process block 136. Following this step, another step of declaring parameter for operation as follows: PARAM_TYPE PARAM is performed (block 137). Note that once the process set illustrated by the block 135 (FIG. 8a) has been performed a branch is taken to the block 137 as denoted by the connector B.

An inquiry is next made as to whether or not there are more parameters as depicted by a decision diamond 138. If the answer to this inquiry is yes, then a branch is taken back to the process block 133 (FIG. 8b) as denoted by the connector C. If there are no more parameters, then another process step of calling create_friend (CONSTRUCT) is performed (block 139). Next, another inquiry is made as to whether or not there are more constructors. If the answer is yes, then a branch is taken back to the beginning step depicted by the block 128 (FIG. 8a) as denoted by the connector D. The process is repeated for each constructor. Once all constructors have been processed, the process continues as depicted by a continue bubble 141.

Figure 8C:
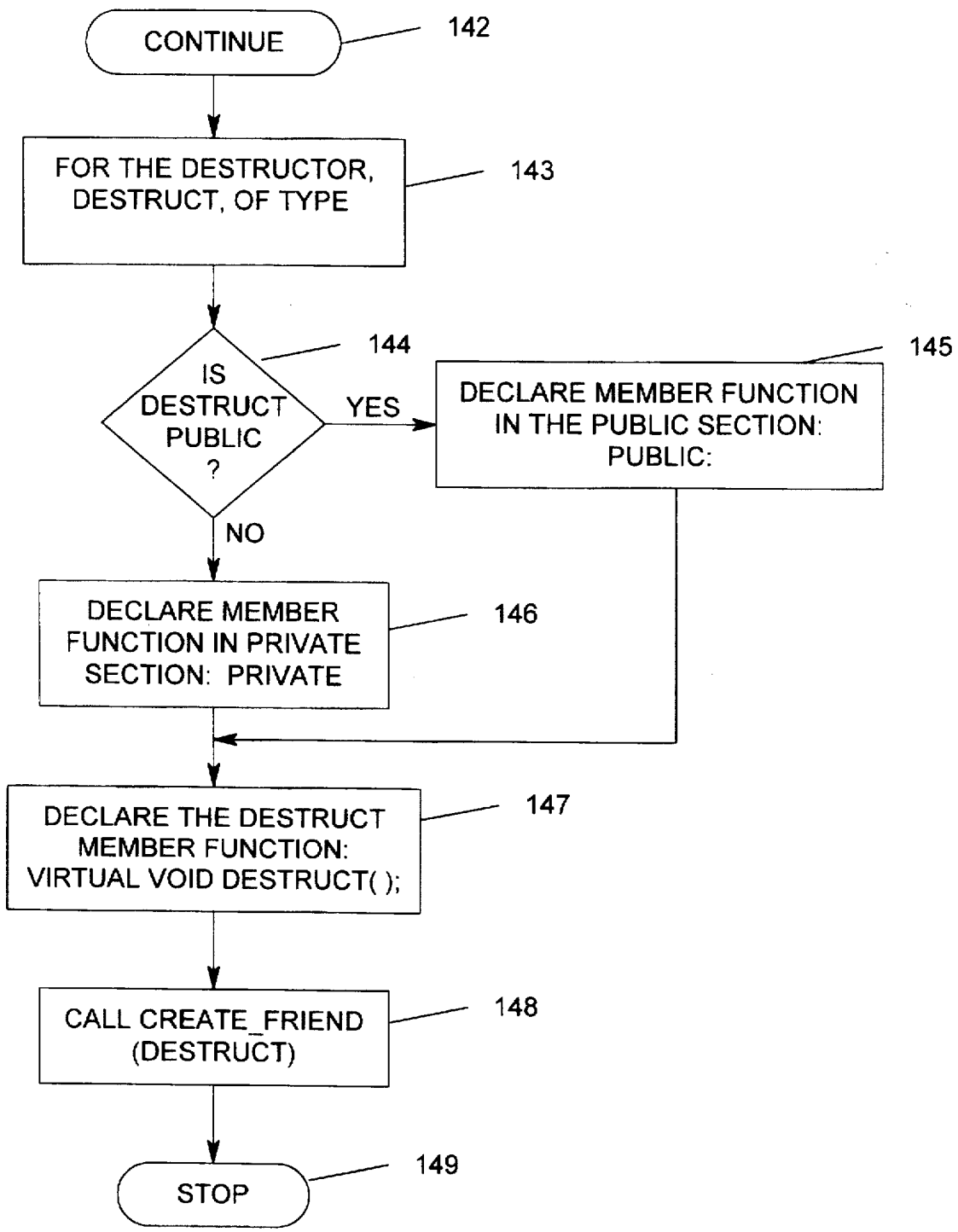

Referring now to FIG. 8c, the above-described process is continued as depicted by a continue bubble 142. Next, a step of declaring the destructor, DESTRUCT of TYPE is performed (block 143). An inquiry is made as to whether or not DESTRUCT is public (decision diamond 144). If the answer to this inquiry is yes, then a step of declaring member function in the public section: public: is performed (block 145). On the other hand if DESTRUCT is not public, then a step of declaring member function in private section: private: is performed (block 146). Following this, a step of declaring the destruct member function: virtual void destruct ( ); is performed (block 147). Note that once the process step depicted by block 145 has been performed a branch is taken to the block 147. Next, a step of calling create_friend (DESTRUCT) is performed, block 148. Following this, the process is ended as depicted by an end bubble 149.

Figure 9A:
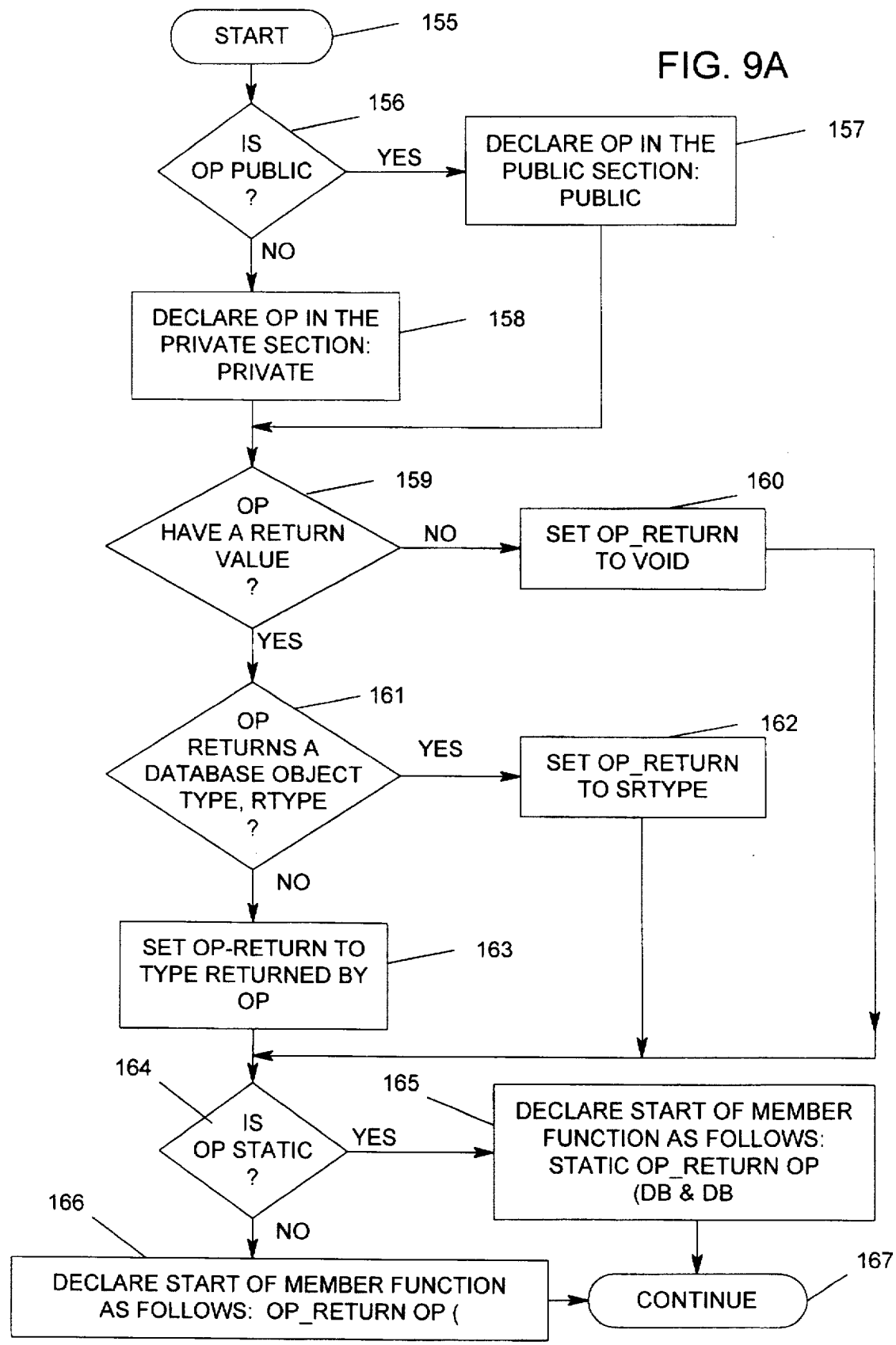
FIGS. 9a, 9b and 9c combined form a flow chart illustrating the process of declaring member functions.

Referring now to FIG. 9a, the first of three sheets forming a flow chart of the process of declaring member functions is shown. The process begins with a start bubble 155, followed by an inquiry as to whether or not OP is public (decision diamond 156). If the answer to this inquiry is yes, then a process step of declaring OP in the public section: public: is performed (block 157). On the other hand if OP is not public, then a process step of declaring OP in the private section: private: is performed (block 158). Another inquiry is next made as to whether OP has a return value (decision diamond 159). Note that once the step shown by block 157 has been completed a branch is also taken to the diamond 159.

If OP has no return value, then a process step of setting OP_RETURN to void is performed as depicted by a blocke 160. If OP does have a return value, then another inquiry is made as to whether or not OP returns a database object type, RTYPE (decision diamond 161). If the answer to this inquiry is yes, then a process step of setting $OP_{13}$ RETURN to sRTYPE is performed (block 162). On the other hand if the answer to this inquiry is no, then a process step of setting OP_RETURN to type returned by OP is performed (block 163). Next, yet another inquiry is made as to whether or not OP is static (decision diamond 164). If the answer to this inquiry is yes, then a process step of declaring start of member function as follows: static OP_RETURN OP (DB & db) is performed (block 165). On the other hand if the answer to this inquiry is no, then a process step of declaring start of member function as follows: OP_RETURN OP ( is performed (block 166). Once the process steps in block 165 and 166 have been performed, then the process is continued as depicted by a continue bubble 167.

Figure 9B:
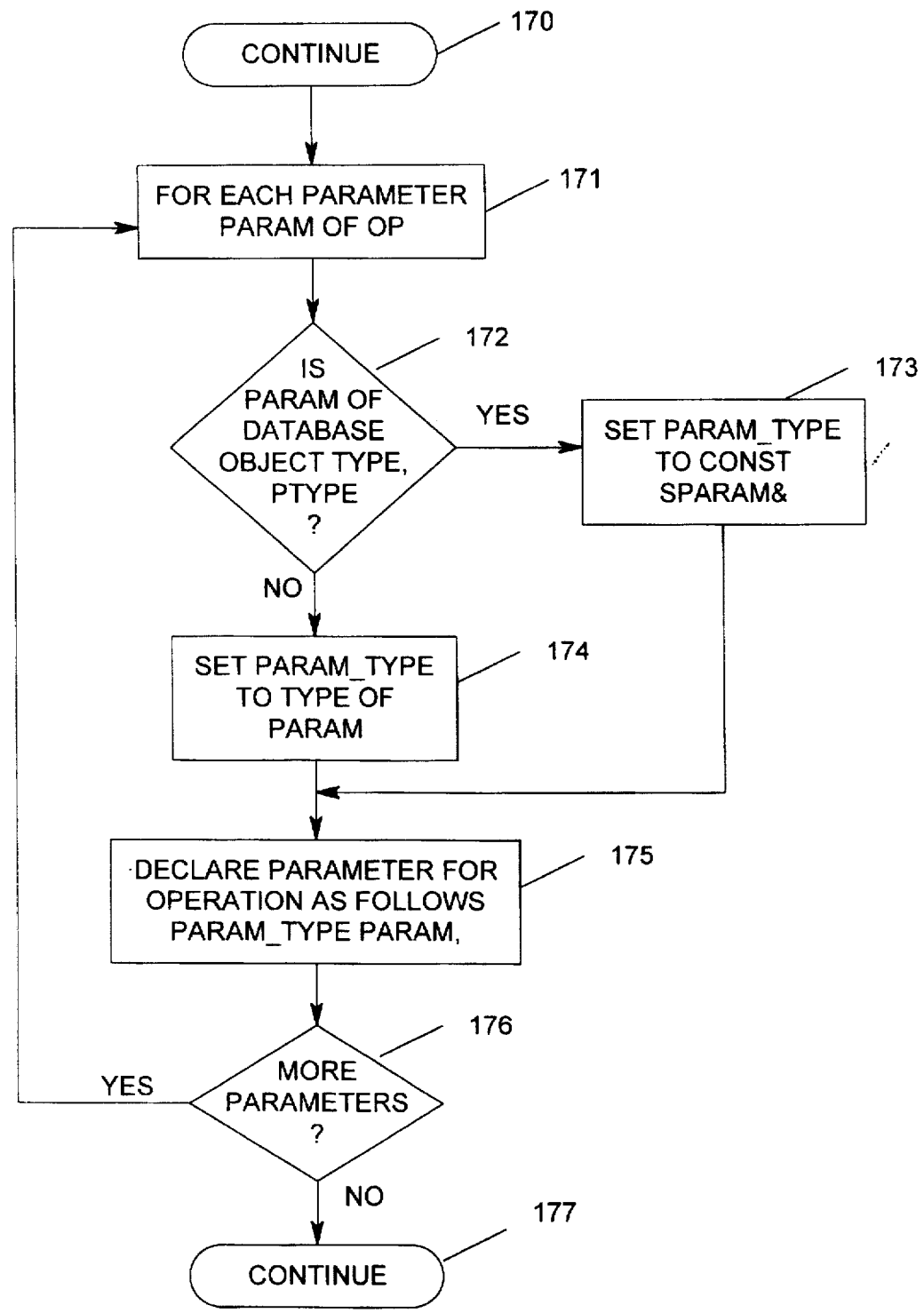

Referring now to FIG. 9b, the above process is continued as noted by a continue bubble 170, followed by a repetitive step for each parameter PARAM of OP is performed (block 171). Next, an inquiry is made as to whether or not PARAM is of a database object type, PTYPE (decision diamond 172). If the answer to this inquiry is yes, then a process step of setting PARAM_TYPE to const sPARAM& is performed (block 173). On the other hand, if the answer is no then a process step of setting PARAM_TYPE to type of PARAM is performed (block 174). Following this, another process step of declaring parameter for operations as follows: PARAM_TYPE PARAM, is performed (block 175). An inquiry is next made as to whether or not there are more parameters (decision diamond 176). If the answer is yes, then a branch is made back to the process block 171 for processing thereof. On the other hand, if the answer is no, then the process is continued on the next sheet as depicted by a continue bubble 177.

Figure 9C:
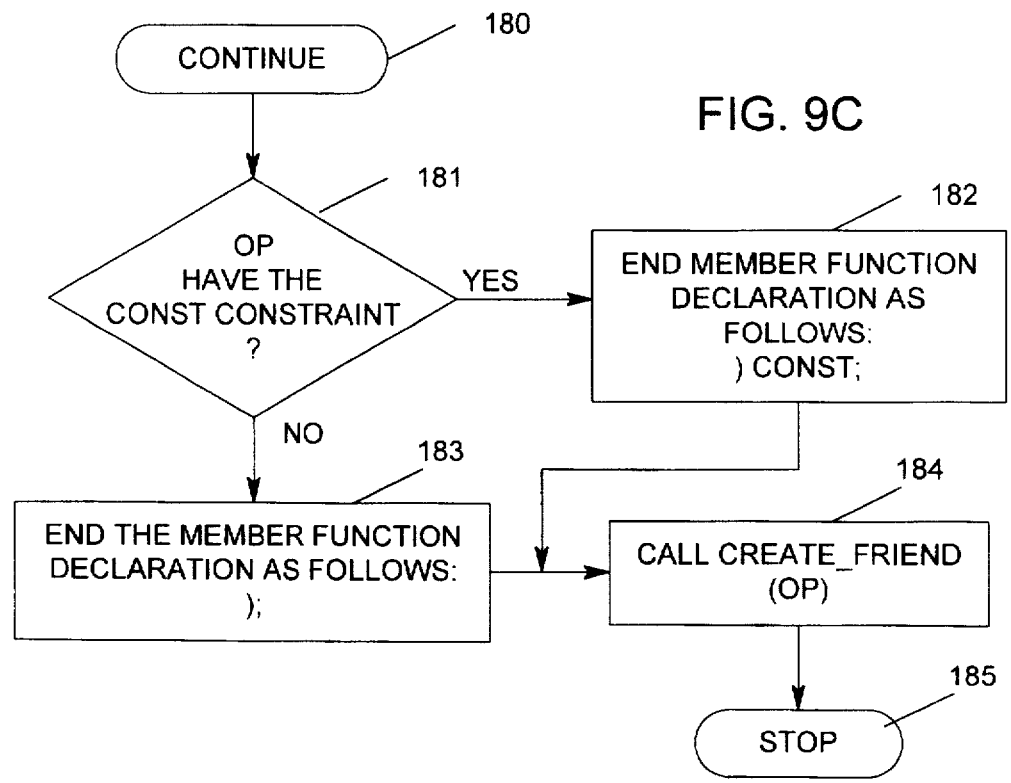

Referring now to FIG. 9c, the remainder of the above-described process is shown beginning with a continue bubble 180 followed by an inquiry if OP has the const constraint (decision diamond 181). If the answer to this inquiry is yes, the a process step of declaring end member function as follows: ) const; is performed (block 182). On the other hand, if the answer is no, the a process step of declaring end of the member function as follows:); is performed (block 183). Next, the process step of calling create_friend (OP) is performed (block 184). Note that after the process step depicted by the block 182 is performed a branch is taken to the block 184. Following this the process is stopped as depicted by a stop bubble 185.

Figure 10:
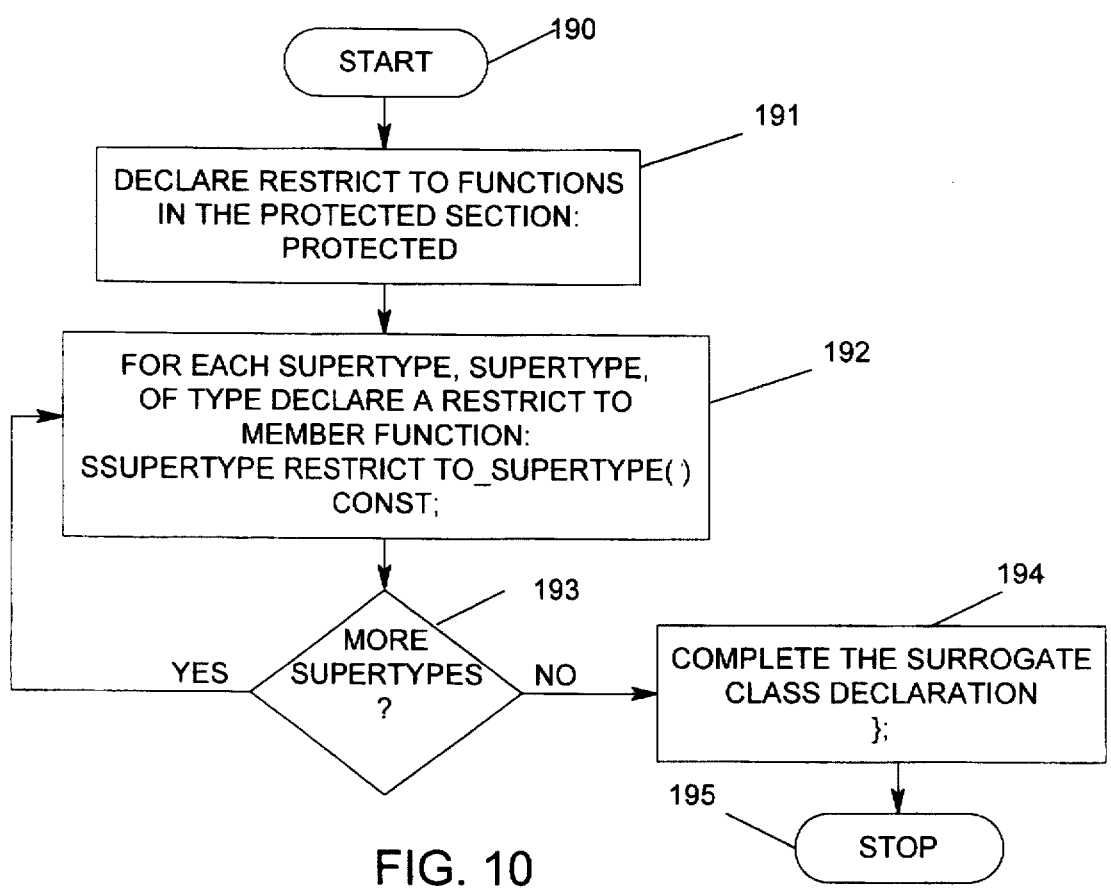
FIG. 10 is a flow chart illustrating the process of declaring special functions.

Referring now to FIG. 10, the process of declaring special functions is illustrated. The process begins with a start bubble 190 followed by a process step of declaring restrict to functions in the protected section: protected is performed (block 191). Next, a process step is performed for each supertype, SUPERTYPE, of TYPE declaring a restrict to member function: sSUPERTYPE restrictTo_SUPERTYPE( ) const; is performed (block 191). Following this step an inquiry is made as to whether or not there are more supertypes (decision diamond 192). If the answer to this inquiry is yes, then the process step depicted by the block 191 is repeated for each supertype. On the other hand, once there are no more supertypes, a process step of completing the surrogate class declaration }; is performed (block 193). Once this step is completed the process is stopped as denoted by a stop bubble 194.

Figure 11A:
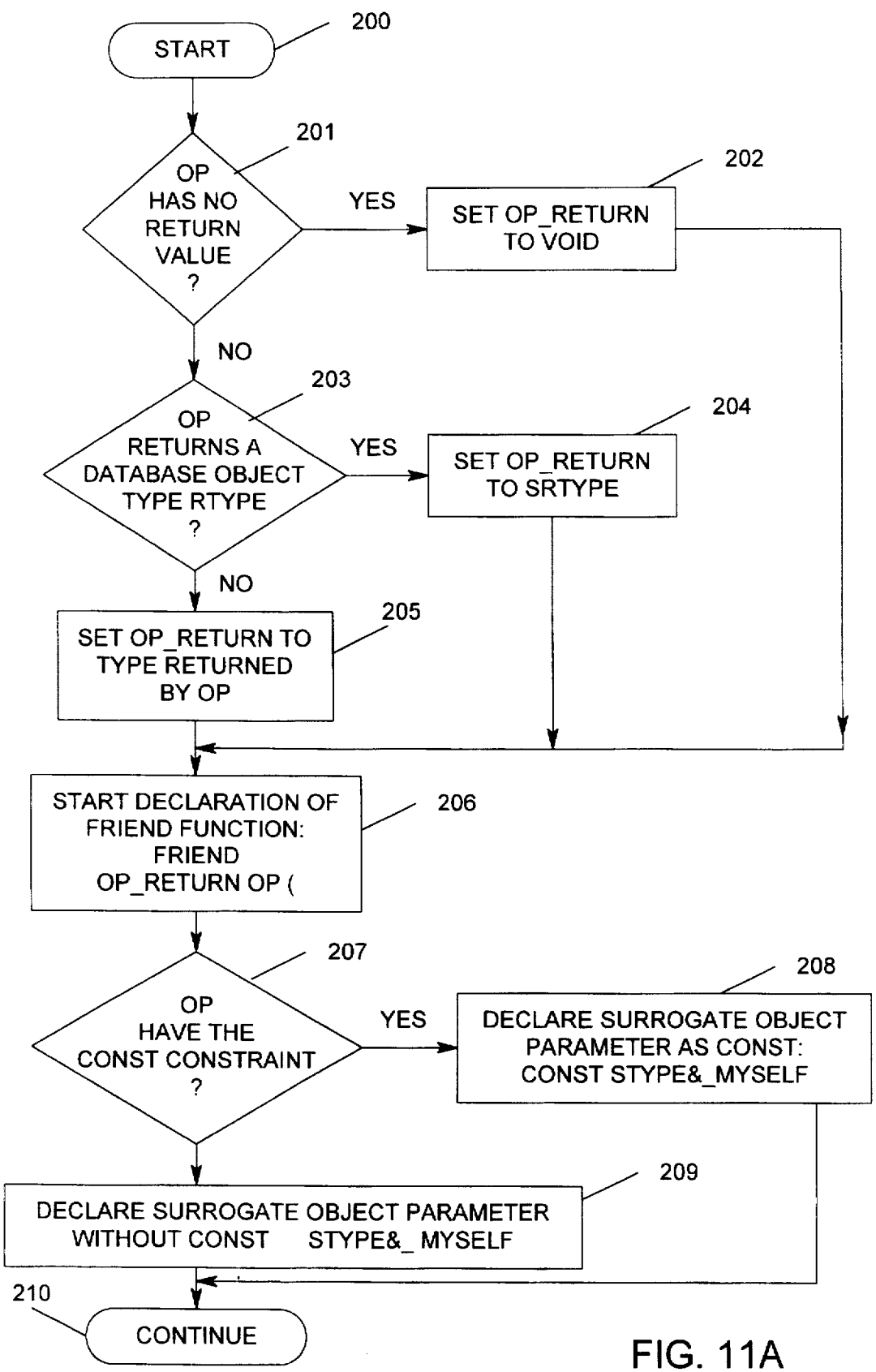
FIGS. 11a and 11b combined illustrate a flow chart of a subroutine for declaring a friend function.

Referring now to FIG. 11a, the first of two sheets forming a combined flow chart that illustrates the declaring a friend function. The process begins with a start bubble 200 followed by an inquiry as to whether or not OP has a return value (decision diamond 201). If OP has no return value, a process step of setting OP_RETURN to void is performed (block 202). On the other hand if OP has a return value, then another inquiry is made as to whether or not OP returns a database object type RTYPE (decision diamond 203). If the answer to this inquiry is yes, then a step of setting OP_RETURN to sRTYPE is performed (block 204). On the other hand if OP does not return a database object type RTYPE, then a step of setting OP_RETURN to type returned by OP is performed (block 205).

Next, a step of starting a declaration of friend function: friend OP_RETURN OP(is performed (block 206). Note that once the steps depicted by the blocks 202 and 204 have been performed a branch is taken to the process step depicted by the block 206. Another inquiry is next made as to whether or not OP has the const constraint (decision diamond 207). If the answer to this inquiry is yes, then a step of declaring surrogate object parameter as const: const sTYPE&__Myself is performed (block 208). On the other hand if the answer to this inquiry is no then a step of declaring surrogate object parameter without const sTYPE&__Myself is performed (block 209). The process is then continued as denoted by a continue bubble 210.

Figure 11B:
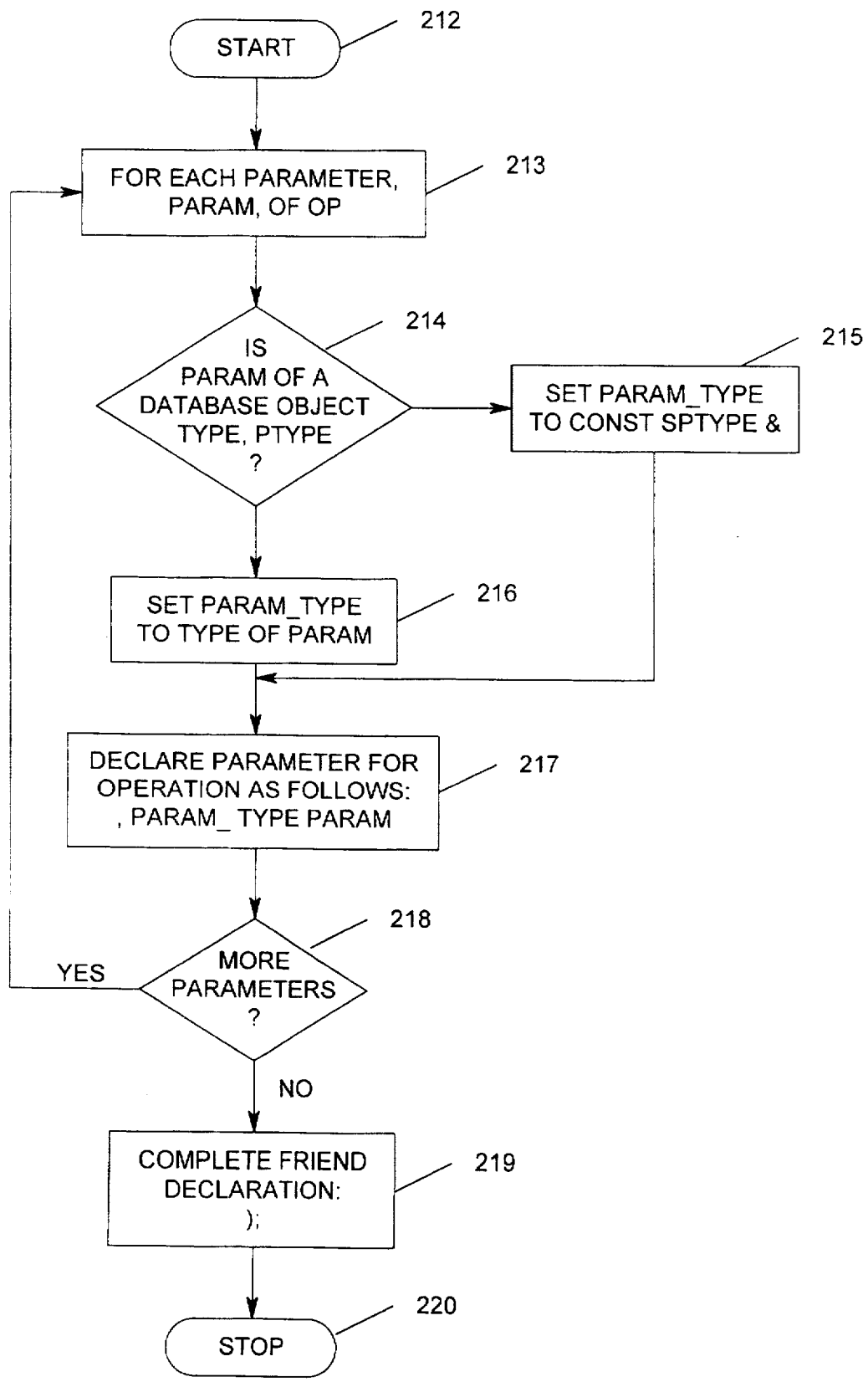

Referring now to FIG. 11b, the above-described process is continued as denoted by a continue bubble 212. Next, a step for each parameter, PARAM, of OP is performed (block 213), followed by an inquiry as to whether or not PARAM is of a database object type, PTYPE (decision diamond 214). If the answer to this inquiry is yes, then a step of setting PARAM_TYPE to const sPTYPE& is performed (block 215). On the other hand if the answer to the inquiry is no then a step of setting PARAM_TYPE to type of PARAM is performed (block 216). Note that once the step depicted by the block 215 has been performed a branch is taken to the step depicted by the block 216.

Next, a step of declaring parameter for operation as follows:, PARAM_TYPE PARAM is performed (block 217). Following this step, an inquiry is made as to whether or not there are more parameters (decision diamond 218). If there are more parameters, then the step depicted by the block 217 is repeated until all parameters have been exhausted, which leads to a step of completing friend declaration ); (block 219). After this step has been performed the process is stopped as depicted by a stop bubble 220.

To more fully appreciate the operation of the above-described process, reference is made to FIGS. 5–11b. Starting at box 71 of FIG. 5, within database there can be any number of types that are actually declared. All databases will provide some way for the programmer to deal with the types directly. But what the method of the invention is doing is coming up with a layer between the actual program and the database. This layer (reference 19 in FIG. 1) doesn't change so that the program itself never has to change if one changes the database. The program deal does not deal with the database types themselves. Instead, a surrogate class is declared for those types.

For each type that is in the database, a surrogate class is declared. So, one time through the entire loop of FIG. 5 is the declaration of a single surrogate class. While we are going through this, the word TYPE means the current type that we are dealing with. So, later on when we say things like "for each operation OP of TYPE," what we are saying is that taking the current type we look at the operations of that type. This is in shown in box 77. We are looking at the operations on that TYPE, and the particular operations (once again it is a "for" loop so we are going to go through them one at a time for however many there are. If there are 30, we will go through it 30 times). Each time we go through the loop we deal with the current one referred to by the shorthand name OP. The word "OP" is the word for the current operation that we are dealing with, which is shorthand for the current operation of the current TYPE. The process of going through the entire set of steps from 71 all the way down to 81 and repeating it is to come up with a class definition for a surrogate class. In order to come up with a class definition for a surrogate class, one must go back to C++ language and determine what makes a valid class definition.

Hence, the steps are performed to build a correct class definition based on C++ for the current class. One declares the surrogate, and then how do you do that? The actual thing that one generates into a file, or for declaring this class, is the word "class" followed by a space, followed by the name of the surrogate class which is denoted by a small "s" followed by the name of the database TYPE.

With reference to FIG. 6, box 86 is a recap of the beginning of what box 72 talked about, i.e., that we're actually going to generate class as TYPE. In diamond 87, we are going to ask if TYPE is a base TYPE. In other words, does TYPE inherit from someone else or is it the base TYPE and it does not inherit from anyone else. If it does inherit from someone else, we have to indicate in our class definition for the surrogate class what is the SUPERTYPE. In box 89 we are going through the SUPERTYPES for our database TYPE and for each one, we are going to declare that surrogate class. The corresponding surrogate class for that SUPERTYPE will be our own superclass for the current surrogate class on which we are working. This is for the current SUPERTYPE with which we are dealing. One generates a colon followed by public and then the name of the surrogate class that represents the SUPERTYPE. Now, if we have a base class, we are going to actually inherit from the special class that we call surrogate. That is why in box 88 we have the public surrogate, from which we are going to inherit.

The declaration of the Constructors and the Destructors for the Surrogate class is at the top. There is a Default Constructor that takes no parameters, a Copy Constructor that takes one parameter and then the Virtual Destructor, all as illustrated by boxes 90, 91 and 92, respectively. We employ standard C++ coding guidelines for declaring classes and their Constructors. All are put into the public section, which is why "public" is in box 90. This is the end of the beginning part of this declaration, which brings us to the class name, its inheritance and sets up the Constructors and Destructors. Referring again to FIG. 5, we are to process each property (boxes 73–75). For each property, we are declaring many things. In box 76, we are going to handle the CONSTRUCT and DESTRUCT member functions. Because the database TYPES will have their own set of Constructors and Destructors, we will map these over as member functions on the surrogate class. Then in boxes 77 through 79, we are processing the operations of the TYPE and declaring things in the surrogate class for the operations. Finally, in box 80, we are closing it up with any special functions required, which completes the entire definition of the class.

With reference to FIGS. 7a, 7b, and 7c, the combined flow chart builds what is needed to put together for the properties of the class. PROP is the current property with which we are dealing. In diamond 96, an inquiry is made as to whether this property is a reference or an attribute? Reference is a pointer off to another instance of another type in the database. Whereas an attribute is a number or boolean value that is retained. It is not a reference off of something else. Also, we are concerned with whether it is single or is it multi-valued? If it is multi-valued, then we have to deal with the collection. This part of the process is split into two parts. The first half attempts to figure out how the accessors are going to be declared. The second half figures out how the mutators are to be declared. The method is the same for both. To begin with we ask is it a property or reference (diamond 96); is it single or multi-valued (diamond 97)? Based on the results of these inquiries, we generate different things. Reference is made to Table I hereinabove, which indicates what is to be generated for the accessors and mutators, and which ones are going to be generated for single valued and multi-valued. The process shown in FIG. 7 is attempting to figure out which one of those things in the Table I actually fit for the current property so that I can actually declare those. This is accomplished by making some variables, such as those in box 98. RTYPE is set to a value and PTYPE is set to a value. The same steps are performed as shown in box 99 and also in box 103. Then, as the process proceeds we finally get to declaring the properties, as in box 112 or box 113. What was set up in RTYPE or in PTYPE is used to generate the things within the classes that are going to be there.

These steps are repeated again for the mutators as shown in FIG. 7c. These steps are setting it all up, and figuring out if it is single or multi-valued. In boxes 98, 99 and 103 we are attempting to figure out what type of return there is going to be on the accessors, how the parameters are passed to the mutators, and so forth. That depends on if it is a reference or an attribute, if it is single or multi-valued, as to which ones are actually needed. Once these are figured out, then one can come up with whatever the accessors and the mutators are.

The steps shown in boxes 113 and 123, where it says declare the multi-valued property accessors or mutators, are things that are following, which is all that is going to be generated into the class definition. This completes the detailed processing of box 74 (FIG. 5). Box 76 of FIG. 5 is amplified in FIGS. 8a, b and c, which is processing for the CONSTRUCTS and DESTRUCTS. With a type and a database, one will typically have several means of constructing it and one means of destructing it. This is the typical way of performing CONSTRUCTS and DESTRUCTS of the type in the database by having Constructors and Destructors on that type, but we already have Constructors and Destructors on the surrogate. This was done in the method shown in FIG. 6. It is not desirable to mix the database in with that because we want to make sure that the surrogate Constructors don't actually CONSTRUCT things in the database. Instead, Construct operations will be declared in the surrogate that are really going to construct the objects in the database.

We know that there is a possibility of having more than one Constructor for the type so we are going to go through it. Box 128 starts the loop and the end of the loop is at box 140. We are going through the whole loop shown in FIGS. 8a and 8b, once for each Constructor that we have. Essentially what we are doing for each one, we are determining do we need to put it into the public or private section (diamond 129)? Boxes 130 and 131 indicate public or private, which generate the words "public" or "private" into our class definition. Then we declare a member function for the Constructor. The member function returns an instance of the surrogate class, therefore we declare it as static. This way you do not have to have an object in order to create another object—you can just call this function and it will return the object that it created. Since Constructors can have parameters, we build up the parameters. This is what is being done in the route that starts in box 133 and goes to box 138.

For each parameter that there is in the Constructor, we have to put a corresponding parameter into the member function on the surrogate class. Later on, down in box 143, there is only going to be one Destructor so there is no "for" loop. We do not have to loop through this. All that we have to do is declare the one Destructor. Fortunately, it cannot have parameters so all that we really have to decide on in box 144 is it public or private? So we can actually get it into the right section. Then, we just declare it, which is in box 147. To make sure that the implementation of these things can actually get a hold of us, we have to declare those Friends, both for the CONSTRUCT member functions and for the DESTRUCT member function that we made (boxes 139 and 148).

Back to FIG. 5, which puts us on that loop for boxes 77, 78 and 79 that is the operations and this is almost exactly like declaring the Constructors. This operation is detailed in FIGS. 9a, 9b and 9c. It goes through pretty much the same thing. Only you are going through all the operations, instead. All the questions are still the same-public or private is in 156, 157 and 158. We have to determine if there is a return value or not. Whereas with the CONSTRUCT, we assumed a particular type of return value. Here we have to ask does this operation have a return value or not and what type is it, and so forth. Also, determine whether the operation is static before we can actually declare the operation at box 166. Boxes 171 through 176 are the same thing that we went through for the parameters on the Constructors. There is nothing different there.

In FIG. 9c we have to finish off the operation by asking if it is to be a constant operation or not because we have to get the const key word in there on box 182. You have to put the const key word in if it is a constant operation. Whereas box 183 leaves it out. That is the question we are asked in diamond 181. In box 184, once again we have to declare the Friend function, so we call up a subroutine to do that.

In FIG. 5, the last thing we have left is box 80 which is Declare Special Functions and that process is amplified in FIG. 10. The only Special Function that we are actually declaring is the Restrict to Function in box 191. The step shown by box 191 puts the Restrict to Functions in the Protected Section so we have to come up the Protected key word so that everything else that follows this is in the Protected Section and 192 does the Restrict to for each of the SUPERTYPES. We go through a loop represented by diamond 193 and block 192, which generates the Restrict to for each of the SUPERTYPES. Then once we are all done, we are at box 194 which closes off the class declaration with a closing semicolon or a closing brace and a semicolon. What we should have at that point is a valid C++ class definition.

That leads us to FIGS. 11a and 11b which illustrate the Create—Friends subroutine. Block 184 and others (148 and 139) are the Create-Friends subroutine which we have in FIGS. 11a and 11b. The thing that we are passing in is what we are going to call OP. In one case, we are passing in CONSTRUCT; another case, DESTRUCT; the third case an operation, OP. Within the subroutine, all of those things are going to be referred to as OP, which is the current operation that we are dealing with. This looks very similar to the declaring of an operation. Because we are going to ask about return values so we can get the right Return Value. The only real major difference here is on box 206 when we actually declare the function we put the key word "Friend" in front of it. Other than that, it is pretty much the same boxes 201 through 205 are attempting to determine what the Return Type is and setting it up properly. The process step depicted by the box 206 will actually generate that into the C++ declaration.

The Friend Function is a stand-alone function so it is not part of the class. To the Friend Function, the very first thing that gets passed is the object that is of concern to this function. With a member function on C++, there is a presumed first parameter which is an object that the function has called. So you do not have to pass the object into the function because it is a presumed first parameter. The Friend functions are not member functions but are stand-alone functions. We have to pass the object in explicitly and so we have to declare a parameter for the object and that is done by the steps illustrated by the boxes 208 and 209. These steps declare that the first parameter is the object on which the function is going to work.

Then looking at FIG. 11b, we get to each parameter. Here we have a loop that we have seen before which is for each parameter of the operation. We have to determine the type of the parameter and then declare that parameter as depicted in box 217. Once these steps have been performed we complete the declaration of the Friend as depicted by the box 219.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

Appendix 1

Sample Program 1: Programming and Testing Logic

| Main Program | |
|---|---|
| Network 1<br>I 0.0  I 0.2  I 0.4    Q 0.0<br>─┤├──┤├──┤/├────( )<br>Q 0.0<br>─┤├─ | Network 1<br>LD   I 0.0      //Load value of I 0.0<br>O    Q 0.0      //Or with Q 0.0 value<br>A    I 0.2      //And with I 0.2 value<br>AN   I 0.4      //And Not with I 0.4<br>=    Q 0.0      //Assign result to Q 0.0 |
| Network 2<br>I 0.1  I 0.3  I 0.4    Q 0.1<br>─┤├──┤├──┤/├────( )<br>Q 0.1<br>─┤├─ | Network 2<br>LD   I 0.1      //Load value of I 0.1<br>O    Q 0.1      //Or with Q 0.1 value<br>A    I 0.3      //And with I 0.3 value<br>AN   I 0.4      //And Not with I 0.4<br>=    Q 0.1      //Assign result to Q 0.1 |
| Network 3<br>I 0.4                M 0.1<br>─┤├──────────────( S ) | Network 3<br>LD   I 0.4      //Load value of I 0.4<br>S    M 0.1     //Set M 0.1 to 1 (on) |
| Network 4<br>M 0.1          T37<br>─┤├───────┤ TON<br>                 │ IN<br>         100─┤ PT | Network 4<br>LD   M 0.1     //Load value of M0.1<br>TON  T37,100    //Timer 37,<br>                //PT = –preset<br>                //100 (@ 0.1 secs) |
| Network 5<br>T37   M 0.1      Q 0.2<br>─┤/├──┤├───────( )<br>                 Q 0.3<br>              ───( ) | Network 5<br>LDN  T37       //Load Not value of T37 bit<br>A    M 0.1     //And with value of M 0.1<br>=    Q 0.2     //Assign result to Q 0.2<br>=    Q 0.3     //Assign result to Q 0.3 |
| Network 6<br>T37   I 0.5      Q 0.4<br>─┤├──┤/├───────( )<br>                 Q 0.5<br>              ───( ) | Network 6<br>LD   T37       //Load value of T37 bit<br>AN   I 0.5     //And Not value of I 0.5<br>=    Q 0.4     //Assign result to Q 0.4<br>=    Q 0.5     //Assign result to Q 0.5 |
| Network 7<br>I 0.5  T37        CT30<br>─┤├──┤├─────────┤ CTU<br>                     │ CU<br>I 0.7<br>─┤├─────────────┤ RESET<br>              12──┤ PT | Network 7<br>LD   I 0.5     //Load value of I 0.5<br>A    T37       //And value of T37 bit<br>LD   I 0.7     //Load value of I 0.7<br>CTU  C30, 12   //Counter 30,<br>                //PT = preset of 12 |
| Network 8<br>I 0.5  T37         M 0.1<br>─┤├──┤├────────( R ) | Network 8<br>LD   I 0.5     //Load value of I 0.5<br>A    T37       //And value of T37 bit<br>R    M 0.1     //Reset value of M 0.1 to 0 |

-44-

```
For each property, PROP, in TYPE
   if PROP is a reference to database type PROPTYPE
      if PROP is single-valued
         set RTYPE to "sPROPTYPE"
         set PTYPE to "const SPROPTYPE&"
      else
         set RTYPE to "Collection<sPROPTYPE>"
         set SRTYPE to "sPROPTYPE"
         set PTYPE to "const Collection<sPROPTYPE>&"
         set SPTYPE to "const sPROPTYPE&"
      endif
   else (PROP is attribute of type ATTRTYPE)
      if PROP is single-valued
         set RTYPE to ATTRTYPE
         set PTYPE to ATTRTYPE
      else
         set RTYPE to "Collection<ATTRTYPE>"
         set SRTYPE to ATTRTYPE
         set PTYPE to ATTRTYPE
         set SPTYPE to ATTRTYPE
      endif
   endif
   if PROP is declared with the private constraint
      declare the accessors for PROP in the private
section:
      private:
   else
      declare the accessors for PROP in the public
section
      public:
   endif
```

-45-
```
If PROP is single valued
   declare the single-valued property accessors:
      RTYPE get_PROP () const;
      int isNull_PROP () const;
else
   declare the multi-valued property accessors:
      RTYPE get_PROP () const;
      SRTYPE get_PROP (int _location) const;
      int contains_PROP (PTYPE value) const;
      int size_PROP () const;
      int isNull_PROP () const;
endif
if PROP is declared with the public constraint
   declare the mutators for PROP in the public section
      public:
else
   declare the mutators for PROP in the private section
      private:
endif
If PROP is single valued
   declare the single-valued property mutators:
      void set_PROP (PTYPE _value);
      void flush_PROP ();
else
   declare the multi-valued property mutators:
      void set_PROP (PTYPE _value);
      void add_PROP (SPTYPE _value);
      void remove_PROP (SPTYPE _value);
      void removeLoc_PROP (int _location);
      void flush_PROP ();
endif
```

-46-
```
For each constructor, CONSTRUCT, in TYPE
   if CONSTRUCT is public
      declare member function in the public section:
         public:
   else
      declare member function in the private section:
         private:
   endif
   declare the construct member function:
      static sTYPE construct (DB& db
   For each parameter, PARAM, of CONSTRUCT
      if PARAM is of a database object type, PTYPE
         set PARAM_TYPE to "const sPTYPE&"
      else
         set PARAM_TYPE to type of PARAM
      endif
      declare parameter for operation as follows:
         , PARAM_TYPE PARAM
   endfor
   Call Create_Friend (CONSTRUCT)
endfor
For the destructor, DESTRUCT, of TYPE
   if DESTRUCT is public
      declare member function in the public section:
         public:
   else
      declare member function in the private section:
         private:
   endif
   declare the destruct member function:
      virtual void destruct();
   Call Create_Friend (DESTRUCT)
endfor
```

-47-
```
For each operation, OP, in TYPE
   if OP is public
      declare OP in the public section:
         public:
   else
      declare OP in the private section:
         private:
   endif
   if OP has no return value
      set OP_RETURN to "void"
   elseif OP returns a database object type, RTYPE
      set OP_RETURN to sRTYPE
   else
      set OP_RETURN to type returned by OP
   endif
   if OP is static
      declare start of member function as follows:
         static OP_RETURN OP (DB& db,
   else
      declare start of member function as follows:
         OP_RETURN OP (
   endif
   For each parameter, PARAM, of OP
      if PARAM is of a database object type, PTYPE
         set PARAM_TYPE to "const sPTYPE&"
      else
         set PARAM_TYPE to type of PARAM
      endif
      declare parameter for operation as follows:
         PARAM_TYPE PARAM,
   endfor
```

-48-
```
      if OP has the const constraint
         end the member function declaration as follows:
            ) const;
      else
         end the member function declaration as follows:
            );
      endif
      Call Create_Friend (CONSTRUCT)
   endfor
   If TYPE is not a base type
      declare restrict to functions in the protected
section:
         protected:
      for each supertype, SUPERTYPE, of TYPE
         declare a restrict to member function:
            sSUPETYPE restrictTo_SUPERTYPE() const;
      endfor
   endif
   Complete the surrogate class declaration:
      );
endfor
```

The algorithm for the Create_Friend function, which accepts as a parameter the operation, OP, is as follows:
```
if OP has no return value
   set OP_RETURN to "void"
elseif OP returns a database object type, RTYPE
   set OP_RETURN to sRTYPE
else
   set OP_RETURN to type returned by OP
endif
Start the declaration of the friend function:
   friend OP_RETURN OP (
```

-49-

```
if OP has the const constraint
   declare the surrogate object parameter as const:
      const sTYPE& _myself
else
   declare the surrogate object parameter without const
      const sTYPE& _myself
endif
For each parameter, PARAM, of OP
   if PARAM is of a database object type, PTYPE
      set PARAM_TYPE to "const sPTYPE&"
   else
      set PARAM_TYPE to type of PARAM
   endif
   declare parameter for operation as follows:
      , PARAM_TYPE PARAM
endfor
Complete the friend declaration:
   );
```

What is claimed is:

1. In a computer system having a user interface, a CPU, a memory, at least one disk drive, and an object oriented database stored in one or more disk drives, a program operating in said computer system for deriving an application programming interface independent from objects stored in said database, said program executing for each database type, TYPE, a method comprising the steps of:

a. opening a file on said at least one disk drive and storing therein results of the following steps;

b. declaring a surrogate class, sTYPE, for a database type, TYPE;

c. for each property, PROP, of TYPE, declaring accessors and mutators;

d. declaring construct and destruct member functions;

e. for each operation, OP, of TYPE, declaring member functions; and, f. declaring special functions.

2. The method as in claim 1 wherein said step of declaring a surrogate class sTYPE further includes the steps of:

a. generating text into said file a declaration of said surrogate sTYPE, wherein said sTYPE inherits from a surrogate class that corresponds to database supertype if TYPE has a supertype;

b. declaring a public default constructor within said generated text that has no parameters;

c. declaring a public copy constructor within said generated text; and, e. declaring a public virtual destructor within said generated text.

3. The method as in claim 1 wherein said step of declaring accessors of properties for said TYPE, PROP, further includes the steps of:

a. generating text into said file a declaration of an accessor to determine if said PROP has a value;

b. declaring an accessor within said generated text to obtain value of said PROP;

c. if said PROP is multi-valued, declaring an accessor within said generated text to obtain an individual value of said PROP based on location, and declaring an accessor within said generated text to obtain the cardinal number or said PROP, and declaring an accessor within said generated text to determine if a value is contained within said PROP.

4. The method as in claim 1 wherein said step of declaring mutators of properties for said TYPE, PROP, further includes the step of generating text into said file of a. a declaration of a mutator to set value of said PROP and a mutator to erase value of said PROP; and, b. if PROP is multi-valued, declaring a mutator within said generated text to add a value to said PROP, and declaring a mutator within said generated text to remove a value from said PROP.

5. The method as in claim 1 wherein said step of declaring construct member functions further includes the steps of:

a. generating text into said file for each constructor in TYPE, CONSTRUCT;

b. declaring a construct member function within said generated text that takes the same parameters as said CONSTRUCT, and returns an object of the class; and, c. declaring a friend function within said generated text for said CONSTRUCT.

6. The method as in claim 1 wherein said step of declaring destruct member functions further includes the steps of:

a. generating text in said file of a declaration of a destruct member function with no parameters for the destructor in TYPE, DESTRUCT; and, c. declaring a friend function within said generated text for said DESTRUCT.

7. The method as in claim 1 wherein said step of declaring member functions further includes the steps of:

a. generating text into said file a declaration for said member function for each operation wherein said member function returns a value as indicated by operation OP and has as parameters the same parameters as defined for operation, OP; and, b. declaring a friend function within said generated text for said member function.

8. The method as in claim 5, 6 or 7 wherein said step of declaring a friend function further includes the step of generating text into said file a declaration for said friend function wherein said friend function takes as parameters an object of said surrogate class and the same parameters as defined for operation, OP, and returns the same value as indicated by operation, OP.

9. The method as in claim 1 wherein said step of declaring special functions further includes the step of generating text into said file to declare a member function used to restrict an object of said surrogate class to a superclass of said surrogate class.

10. The method as in claim 1 further including a step of generating text into said file a declaration for a class called Surrogate that contains information used to identify the database object, said class having constructors, a destructor and member functions.

11. The method as in claim 1 further including a step of generating text into said file a declaration for a class called DB having constructors, a destructor and member functions.

12. The method as in claim 1 further including a step of generating text into said file a declaration for a class called Collection having constructors, a destructor and member functions.

13. In a computer system having a user interface, a CPU, a memory, at least one disk drive, and an object oriented database stored in one or more disk drives, a program operating in said computer system for deriving an application programming interface independent from objects stored in said database, said program executing for each database type, TYPE, a method comprising the steps of:

a. opening a file on said at least one disk drive and storing therein results of the following steps;

b. declaring a surrogate class, sTYPE, for a database type, TYPE, if TYPE is a base type, sTYPE inheriting publicly for said surrogate class; if TYPE is not a base type, sTYPE inheriting from surrogate class that corresponds to database supertype; declaring a public default constructor that has no parameters; declaring a public copy constructor; and, declaring a public virtual destructor;

c. for each property, PROP, of TYPE, declaring accessors and mutators;

d. declaring construct and destruct member functions;

e. for each operation, OP, of TYPE, declaring member functions; and, f. declaring special functions.

14. The method as in claim 13 wherein said step of declaring accessors and mutators further includes the steps of:

a. if PROP is a reference to a database type PROPTYPE and if PROP is single-valued, setting RTYPE to sPROPTYPE, setting PTYPE to a constant sPROPTYPE&;

b. if PROP is a reference to database type PROPTYPE and PROP is not single-valued, setting RTYPE to a collection <sPROPTYPE>, setting SRTYPE to SPROPTYPE, setting PTYPE to a constant collection <sPROPTYPE>& and setting SPTYPE to a constant sPROPTYPE&;

c. if PROP is not a reference to a database type PROPTYPE, setting a variable, ATTRTYPE to a type of attribute of PROP; d. if PROP is not a reference and is single-valued, setting RTYPE ATTRTYPE and setting PTYPE to ATTRTYPE;

e. if PROP is not a reference and is not single-valued, setting a variable RTYPE to collection<ATTRTYPE>, setting a variable SRTYPE to ATTRTYPE, setting a variable PTYPE to ATTRTYPE and setting a variable SPTYPE to ATTRTYPE;

f. if PROP is declared with private constraint, declaring accessors for PROP in private section;

g. if PROP is declared without private constraints, declaring accessors for PROP in the public section;

h. if PROP is single-valued, declaring single-valued accessors as follows:
RTYPE get_PROP( )const;
and int isNull_PROP( )const;

i. if PROP is not single-valued, declaring multi-valued property accessors as follows:
RTYPE get_PROP( )const;
SRTYPE get_PROP(int_location)const;
int contains_PROP(PTYPE value)const;
int size_PROP( )const;
int isNull_PROP( )const;

j. if PROP is declared with public constraints, declaring mutators for PROP in public section;

k. if PROP is not declared with public constraints, declaring mutators for PROP in private section private;

l. if PROP is single-valued, declaring single-valued property mutators as follows:
void set-PROP(PTYPE_value);
void flush_PROP( ); and, m. if PROP is not single-valued, declaring multi-valued mutators as follows:
void set_PROP (PTYEP_value);
void add_PROP (SPTYPE_value);
void remove_PROP (SPTYPE_value);
void flush_PROP( ).

15. The method as in claim 13 wherein said step of declaring construct and destruct member functions further includes the steps of:

a. for each constructor CONSTRUCT in TYPE, executing the following:

b. if CONSTRUCT is public, declaring member function in public section;

c. if CONSTRUCT is not public, declaring member function in private section;

d. declaring construct member function as follows:
static STYPE construct (DB&db);

e. for each parameter, PARAM, of CONSTRUCT, executing the following steps:
i) if PARAM is of a database object type, PTYPE, setting PARAM_TYPE to const sPTYPE&;
ii) if PARAM is not of a database object type, PTYPPE, setting PARAM_TYPE to type of PARAM;
iii) declaring parameter for operation as follows: PARAM_TYPE PARAM;

g. calling create_friend (CONSTRUCT);

h. if DESTRUCT is public, declaring member function in public section public;

i. if DESTRUCT is not public, declaring member function in private section private;

j. declaring destruct member function as follows:
virtual void destruct( ); and, k. calling create_friend (DESTRUCT).

16. The method as in claim 13 wherein said step of declaring member functions further includes the steps of:

a. if OP is public, declaring OP in the public section;

b. if OP is not public, declaring OP in the private section;

c. if OP has no return value, setting OP_RETURN to void;

d. if OP returns a database object type, RTYPE, setting OP_RETURN to sRTYPE;

e. if OP does not return a database object type, RTYPE, setting OP_RETURN to type returned by OP;

f. if OP is static, declaring start of member function as follows: static OP_RETURN OP (DB & db;

g. if OP is not static declaring start of member function as follows: OP_RETURN OP(;

h. for each parameter, PARAM, of OP, executing the following steps:
i) if PARAM is of database object type, PTYPE, setting PARAM_TYPE to a constant sPARAM&;
ii) if PARAM is not of database object type, PTYPE, setting PARAM_TYPE to type of PARAM;
iii) declaring parameter for operation as follows: PARAM_TYPE PARAM;

i. if OP has the constant constraint, ending member function declaration as follows:

j. if OP does not have the constant constraint, ending member function declaration as follows: ); and, k. calling create_friend (OP).

17. The method as in claim 13 wherein said steps of calling create_friend, calling create_friend (DESTRUCT) and calling create_friend (OP) further include the steps of:

a. if OP has no return value, setting OP_RETURN to void;

b. if OP has a return value and OP returns a database object type, RTYPE, setting OP_RETURN to SRTYPE;

c if OP does not return a database object type, RTYPE, setting OP_RETURN to type returned by OP;

d. starting declaration of friend function as follows:
friend OP_RETURN OP(;

e. if OP has a constant constraint, declaring is surrogate object parameters as follows: const sTYPE&_myself;

f. if OP does not have a constant constraint, declaring surrogate object parameter without constant as follows: sTYPE&_myself;

g. for each parameter, P of OP, executing the following steps:
i) if PARAM is of a database object type, PTYPE, setting PARAM_TYPE to const sPTYPE&;
ii) if PARAM is not of a database object type, PTYPE, setting PARAM_TYPE to type of PARAM;
iii) declaring parameter for operation as follows: PARAM_TYPE PARAM; and, h. completing friend function declaration begun in step d hereof by generating characters);.

18. The method as in claim 13 wherein said step of declaring special functions further includes the steps of:
   a. declaring restrict to functions in protected section protected; and;
   b. for each supertype, SUPERTYPE, of TYPE, declaring a restrict to member function as follows:
      sSUPERTYPE restrictTo_SUPERTYPE( ) const.

19. The method as in claim 13 further including a step of generating text into said file a declaration for a class called Surrogate that contains information used to identify the database object, said class having constructors, a destructor and member functions.

20. The method as in claim 13 further including a step of generating text into said file a declaration for a class called DB having constructors, a destructor and member functions.

21. The method as in claim 13 further including a step of generating text into said file a declaration for a class called Collection having constructors, a destructor and member functions.

* * * * *